March 6, 1962

R. GORDON 3,024,007

TEMPERATURE CONTROL SYSTEM

Filed Oct. 1, 1956

INVENTOR
Robert Gordon
BY
ATTORNEYS

March 6, 1962 R. GORDON 3,024,007
TEMPERATURE CONTROL SYSTEM
Filed Oct. 1, 1956 7 Sheets-Sheet 2

INVENTOR
Robert Gordon
BY
ATTORNEYS

March 6, 1962 R. GORDON 3,024,007
TEMPERATURE CONTROL SYSTEM
Filed Oct. 1, 1956 7 Sheets-Sheet 3

INVENTOR
Robert Gordon
BY
ATTORNEYS

March 6, 1962
R. GORDON
3,024,007
TEMPERATURE CONTROL SYSTEM
Filed Oct. 1, 1956
7 Sheets-Sheet 4
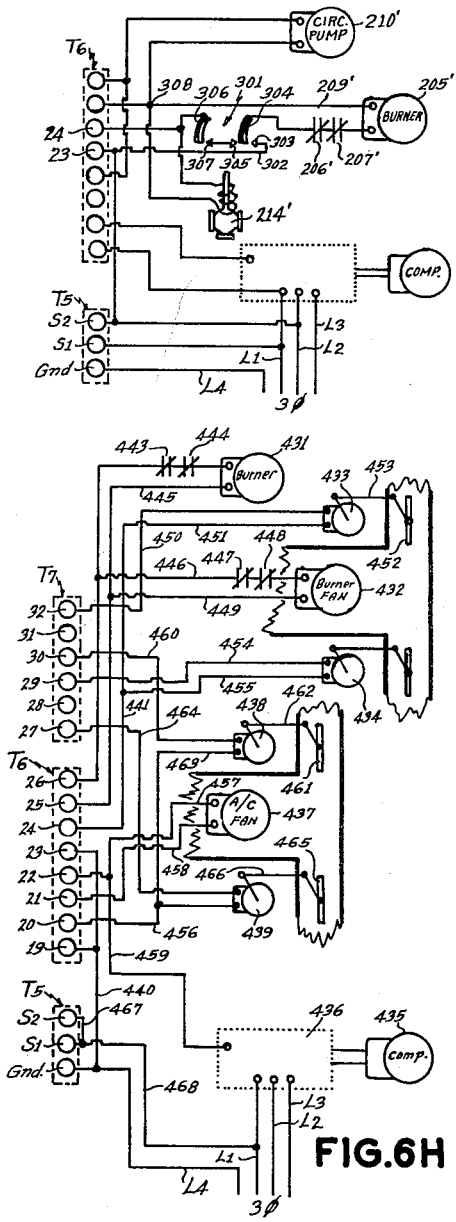
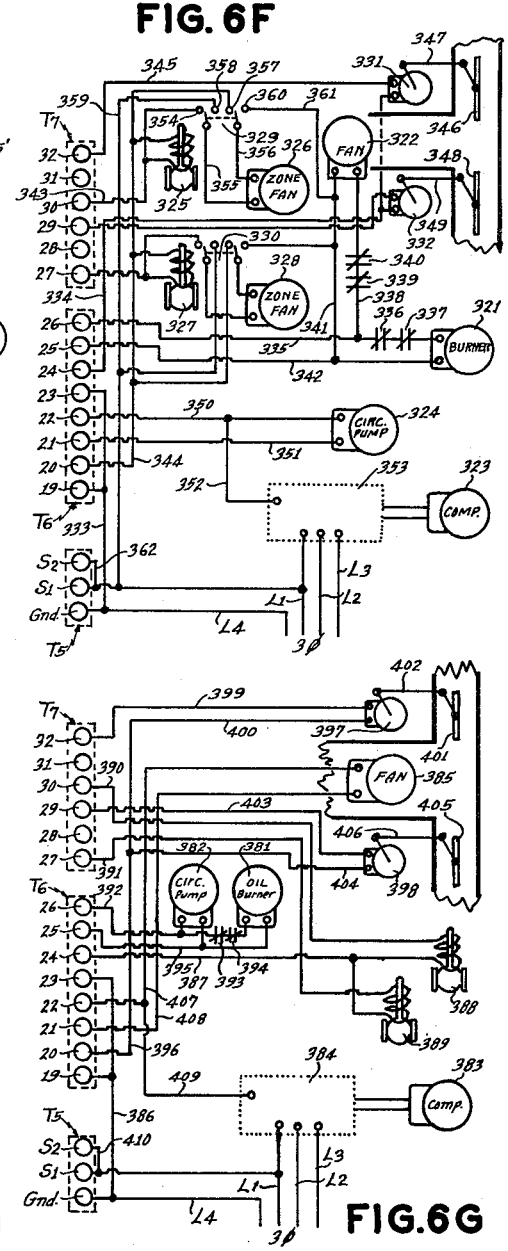
INVENTOR
Robert Gordon
BY Edwin Levisohn + Harry Cohn
ATTORNEYS March 6, 1962 R. GORDON 3,024,007
TEMPERATURE CONTROL SYSTEM
Filed Oct. 1, 1956 7 Sheets-Sheet 6

INVENTOR
*Robert Gordon*
BY
ATTORNEYS

March 6, 1962  R. GORDON  3,024,007
TEMPERATURE CONTROL SYSTEM
Filed Oct. 1, 1956  7 Sheets-Sheet 7

INVENTOR
Robert Gordon
BY
ATTORNEYS

United States Patent Office 3,024,007
Patented Mar. 6, 1962

3,024,007
TEMPERATURE CONTROL SYSTEM
Robert Gordon, Jersey City, N.J.
(1963 E. 7th St., Parkersburg, W. Va.)
Filed Oct. 1, 1956, Ser. No. 613,052
14 Claims. (Cl. 257—283)

The invention relates, in general, to a temperature control system and, more particularly, to such systems constructed for both automatic heating and cooling in year around service. It is desirable to divide a building or large area, whose temperature is being controlled, into two or more zones in order to maintain more accurate control of comfort conditions. The use of zones is usually oriented in one of several ways; to the relative movement of the sun which decreases the heating requirement and increases the cooling load on those zones facing the sun; to a possible increase in the human load in one of the zones; to the shifting of the human load from one zone to another within the total conditioned area; to the increase in the lighting and equipment load in any one zone or the shifting of that load from one zone to another within the total conditioned area; or, to a combination of these and any other varying load conditions. It is also desirable at times to be able to operate individual zones while others are shut down. These procedures result in a considerable savings in operating expense as those zones requiring a temporarily lesser capacity than maximum, drain only their actual requirement from the central heating or cooling equipment; it also results in a saving on initial cost of equipment as smaller central equipment will give equivalent satisfaction. The consumer-user of such equipment, especially the homeowner and smaller commercial and professional building owner, has been deterred from purchasing automatic zone systems because of high initial cost of central controls, and the high cost of installation and servicing of existing control methods. Existing methods also require highly trained service engineers who are not readily available.

An object of my invention is to provide a control system for a multiple zone heating and cooling system according to which the operation of primary equipment, such as refrigerant compressors, oil burners, fuel valves, circulating water pumps, electric change-over valves, fans, etc., as well as the secondary equipment, such as zone fans, valves, dampers, etc., is placed under the direct control of sensing devices located in any one of the zones.

Another object of my invention is to provide a control panel which is basically universal in application. In this connection, another object is to provide a control panel, which, with no internal changes, will control such arrangement of primary equipment as: a circulating water heat-pump, utilizing a single circulating pump and having refrigerant change-over valves for selection of heating and cooling; a boiler and chiller using individual circulating pumps for each; a boiler and chiller using a common circulating pump with a change-over valve; a forced air heating and cooling system using a common duct system; a combined system where heating may be by means of circulating water and cooling by means of ductwork, or vice versa; or, heating and cooling utilizing separate heating and cooling ducts. In this connection, a further object is to provide a control panel which, with no internal changes, will control various different types of secondary equipment which may have valves or fans, or both, or dampers controlled directly by the control panel; which secondary or zone equipment may consist of fan-coil units, natural convection heat convectors or cooling coils, baseboard radiation, radiant panel zones, etc.; and wherein secondary equipment for different zones in a single system may be intermixed at will, as well as wherein one zone may be constructed for heating alone, another for cooling alone, while others may serve for both heating and cooling. In this connection, a still further object is to provide a control panel which will function with various different types of sensing devices, such as zone thermostats which may be simple heating units, or simple cooling units, or simple heating-cooling units of the single-pole double-throw type, or the type having separately adjustable interlocked heating and cooling elements and equipped with manual switches for system operation, dehumidification timing and manual fan functions; or thermostats may be intermixed at will to control each zone as required for that zone, regardless of the type required for another zone in the same system.

Another object of my invention is to decrease the space requirement of the central controls utilized in the operation by providing them in a compact integrated unit.

Another object of my invention is to provide a control panel having power output terminals so as to directly feed and control both primary and secondary equipment.

Another object of my invention is to provide terminals on the control panel for sensing devices, such as zone thermostats, manual zone fan controls, heating and cooling medium return temperature controls, automatic outdoor resetting control, remote manual central selector controls, and remote pilot light indicators.

Another object is to obviate the necessity to custom build a main control panel for each installation in accordance with the number of zones to be controlled. In accordance with the foregoing object, it is another object to provide a control panel which can be mass produced, at relatively low cost, for use without regard to the number of zones to be controlled.

Another object of my invention is to provide means on the control panel to permit for extension of the operation of the panel to additional zones, as required. In accordance with the foregoing object, another object is the provision of a compact and low cost terminal block arrangement which can be added to the control panel at any time, either during the initial installation or at a later date, without upsetting any device on the control panel and yet providing full integration with all components, as if the terminal blocks had been originally constructed as a physical part thereof.

A further object of my invention is to extend the function of the control panel to include the control of such accessories as dehumidification cycling timers, attic exhaust fan-fire alarm units, etc. In this connection, in the case of an attic fan, the panel would permit the attic fan— when set for automatic operation—to operate at any time the central system was aligned for cooling, if the attic temperature rose above a predetermined point; if the system was aligned for heating, the fan operation would be inhibited to prevent reducing the total heat content of the building; if a fire occured in the attic, or wherever a sensing device may be installed, an alarm would sound whether or not the attic fan was operating, and if the fan was operating, either manually or automatically, it would be stopped immediately.

A still further object of my invention is to provide a generally improved, efficient and relatively low cost means for controlling a multiple zone heating and cooling system, which can be installed by the average electrician without specialized training, and which will provide trouble-free operation requiring a minimum of maintenance.

The above and other objects, features and advantages of the present invention will be more fully understood from the following description considered in connection with the accompanying illustrative drawings.

In the drawings, which illustrate the best modes presently contemplated by me of carrying out the invention:

FIG. 6E illustrates a modification of FIG. 6B, the boiler being utilized for maintaining a supply of domestic hot water the year around, and the boiler temperature being increased during a heating cycle;

FIG. 6F is a view similar to FIG. 6 and illustrates a combined system utilizing a multiple zone duct system for heating directly from a forced air heating furnace and a circulating water chiller system for cooling the same multiple zones;

FIG. 6G is a view similar to FIG. 6 and illustrates a combined system utilizing a circulating hot water multiple zone installation for the heating cycle and a multiple zone duct system for the cooling system, receiving the cooling effect directly from the direct expansion cooling coil;

FIG. 6H is a view similar to FIG. 6 and illustrates a dual duct system utilizing separate multiple zone duct work for the heating and cooling functions;

Figure 1:
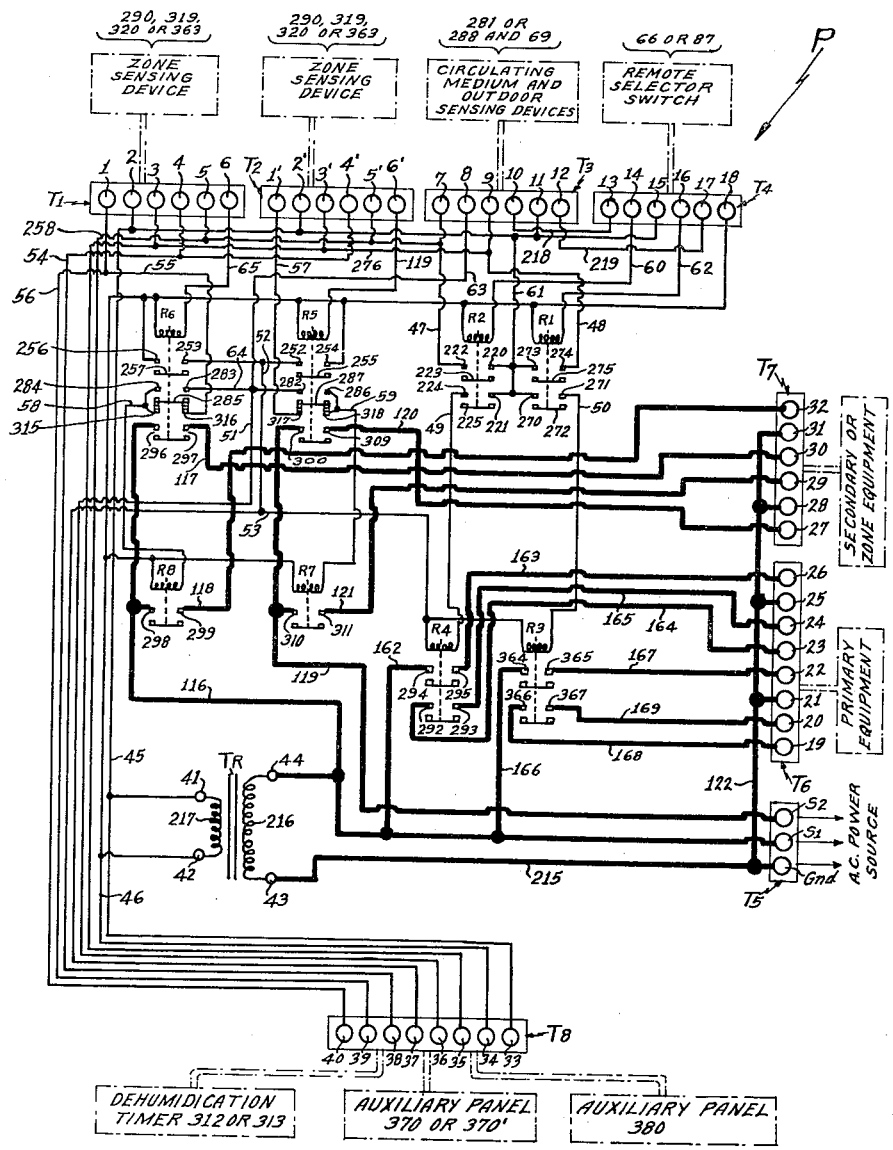
FIG. 1 is a schematic illustration and wiring diagram of the central integrating control panel, for a two zone system, all external wiring being omitted.

Referring now to FIG. 1 of the drawings in detail, there is shown a control panel P, pursuant to the present invention, which panel is provided with eight terminal blocks or strips designated T1 through T8. Blocks T1 and T2 are utilized for making connections with leads from thermostats located in two different zones provided in an area whose temperature is being controlled, said zones being designated herein, for convenience of description, as zone 1 and zone 2, respectively. Blocks T1 and T2 are provided with the terminals 1 through 6 and 1' through 6', respectively. Each designated terminal of block T1 provides the same functions for zone 1 that the corresponding terminal of block T2, having the corresponding primed reference numeral, provides for zone 2. For example, terminal 3 of block T1 has the same function as terminal 3' of block T2. Terminal block T3 contains six terminals designated by the reference numerals 7 through 12. Terminals 7, 8 and 9 are utilized for connection to a return water aquastat, or duct temperature switch, as required for the installation. Terminals 10, 11 and 12 are utilized for connection to an optional outdoor resetting device which is utilized when it is desired to have the system changed automatically from heating to cooling, according to a rise or fall in outdoor temperature. Terminal block T4 contains the terminals designated by the reference numerals 13 through 18 and is utilized for the connection of a remote manual selector switch. Terminal block T5 is utilized for connection to the electric power mains to provide a line voltage input to the panel P and contains the three terminals designated "GND" (ground), S1 and S2; these terminals being connected to the incoming power lines. Terminal block T6 includes the terminals designated by the reference numerals 19 through 26 and is utilized for making the connections to the primary equipment hereinafter referred to. Terminals 19 through 22 are utilized for the cooling cycle, and terminals 23 through 26 are utilized for the heating cycle.

Terminal block T7 includes the terminals designated by the reference numerals 27 through 32 and is utilized for making the connections to the secondary or zone operating equipment hereinafter referred to. Terminals 27 through 29 are utilized for the zone 2 equipment and terminals 30 and 32 are utilized for the zone 1 equipment. The ground terminal on terminal block T5 is connected, internally of the panel, by lead 122, to terminals 21 and 25 on terminal strip T6, and to terminals 28 and 31 on terminal strip T7. This arrangement provides for a simpler installation by providing a ground connection immediately adjacent to the controlled power leg required by the various operating components, as hereinafter described.

Terminal block T8 includes the terminals designated by the reference numerals 33 through 40, and is utilized for extending the operation and zone functions of the main control panel P to other zones in addition to the two zones previously referred to, as hereinafter described in detail.

The main control panel P includes a transformer designated as TR, having a primary winding 216 which is connected from its terminal 43, by lead 215, to the ground terminal of terminal block T5 and from its terminal 44, by lead 116, to the S1 terminal of terminal strip T5 to provide a 115 volt power input to the primary winding.

The panel includes eight relays designated as R1 through R8. The function of relays R1 and R2 is to condition, or align, the control system either as a heating system or as a cooling system. Relay R1 will be referred to herein as the cooling alignment relay and R2 will be referred to herein as the heating alignment relay. Relay R3 is the main cooling relay and operates the cooling equipment through its connections to terminal block T6. Relay R4 is the main heating relay and operates the heating equipment through its connections to terminal block T6. Relay R5 is the operating relay for zone 2, and relay R6 is the operating relay for zone 1. Relay R7 will be referred to herein as the fan relay for zone 2, and relay R8 will be referred to herein as the fan relay for zone 1; however it is to be noted that, although these relays are referred to as fan relays, the universality of the control panel P will at times effect the operation of these relays for functions other than a fan function.

Due to the universality of control made possible by the control panel P which allows for the use of a multiplicity of remote controls and controlled circuits, the internal circuitry of the panel will be described in connection with the operation of various connected external components so as to facilitate the description of the present invention.

Figure 2:
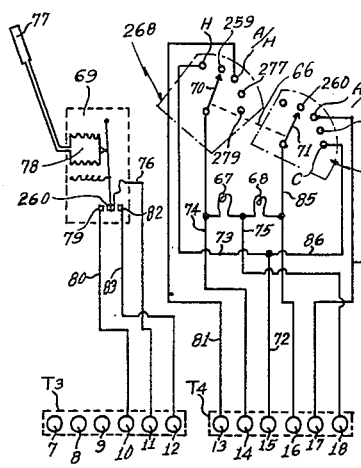
FIG. 2 is a wiring diagram of a remote selector switch which is to be connected to the control panel when it is desired to use an automatic outdoor resetting device and to change the system from heating to cooling, or vice versa, and shows in phantom the connection of the leads to terminal blocks of FIG. 1.

Referring now to FIG. 2 in detail, there is shown a manual selector switch 66 which consists of a 2-pole 5-position switch and two pilot lights 67 and 68. FIG. 2 also illustrates an outdoor resetting thermostat 69. One pole of selector switch 66 has a movable contact 70 connected by lead 74 to terminal 14 on terminal block T4 of panel P to serve the heating function of the system. The other pole has a movable contact 71 mechanically ganged with contact 70 and connected by lead 85 to terminal 16 on terminal block T4 of the panel to serve the cooling function of the system. The secondary winding 217 of transformer TR in panel P is connected by its terminal 41 to conductor 45 which interconnects terminal 2 of block T1, terminal 2' of block T2, terminal 11 of block T3, terminal 15 of block T4, and terminal 33 of block T8. The other end of the secondary winding is connected from its terminal 42 to conductor 46 which extends from terminal 18 of block T4 to terminal 34 of block T8. Terminals 10 and 12 on terminal block T3 are connected to terminals 13 and 17 on terminal block T4 by leads 218 and 219, respectively. Having traced the circuit from terminal 41 of the transformer to terminal 15 on block T4, the circuit continues from terminal 15 through conductor 72 and conductor 73 to stationary contact H of one of the poles of the selector switch. When contacts H and 70 are engaged, power flow will be across contacts H and 70 through conductor 74 to terminal 14 of terminal block T4. Pilot light 67 will then light as the output from terminal 41 of the transformer is available at conductor 74, while the other side of the pilot light is connected through conductor 75 to terminal 18 on terminal block T4 which is connected to terminal 42 of transformer TR. Consequently, the output at terminal 41 of the transformer is available at terminal 14 of terminal block T4 when the selector switch 66 is engaged at the H contact thereof and said transformer terminal is now connected through conductor 60 from terminal 14 to one side of the coil of the heating alignment relay R2. The other side of the coil relay R2 is connected via conductor 46 to terminal 42 of the transformer. Relay R2 is therefore energized and operates to align the system as a heating system. A conductor 61 in the panel P is connected through conductor 45 to terminal 41 of the transformer. Conductor 61 is connected to the stationary contacts 220 and 221 of relay R2. When the relay R2 is energized its stationary contacts 220 and 222 are bridged by its armature 223 and its stationary contacts 221 and 224 are bridged by its armature 225. Consequently, energization of relay R2 permits polarity 41 to cross both sets of contacts of the double pole relay R2. The lower contact 224 of relay R2 is connected by conductor 49 to one side of the heating relay R4. The other side of relay R4 is connected by conductor 53 and conductor 52 to the upper stationary contacts 252 and 253, respectively, of relays R5 and R6, these relays being shown unenergized in which condition relay R4 is unenergized. If relay R5 is energized, its upper stationary contacts 252 and 254 are bridged by its armature 255 so that relay R4 is connected therethrough and by means of lead 46 to the terminal 42 of transformer secondary 217. Similarly, energization of relay R6 will connect relay R4 to said transformer terminal 42 through the upper stationary contacts 253 and 256 of relay R6, bridged by armature 257 of the latter. Energization of relay R4 results in operation of the heating equipment. However, as neither relay R5 nor relay R6 is operating, relay R4 will remain inoperative but the system will be aligned for heating. Conductor 53 is also connected to terminal 38 on terminal block T8, the function of which will be described later. With relay R2 energized, the output from terminal 41 of the transformer crosses its upper contacts 220—222 from conductor 61 through conductor 47 to terminal 7 of terminal strip T3, and through conductor 258 to terminal 5' of terminal strip T2, to terminal 5 of terminal strip T1 and to terminal 35 of terminal strip T8.

Contacts 259 and 260 on selector switch 66 are "Off" positions on each pole of the selector switch. Immediately clockwise of each "Off" position is a middle switch position, indicated as A/H on the heating pole 268 of the switch and as A/C on the cooling pole 269 of the switch. These middle positions are utilized for automatic change-over of the system from heating to cooling, or vice versa, according to the increase or decrease in outdoor temperature.

As previously described, output from terminal 41 of the transformer TR in FIG. 1 is available at terminal 11 of terminal strip T3. The circuit continues on FIG. 2 through conductor 76 to the central movable contact 260 of the outdoor resetting thermostat or sensing device 69. The outdoor resetting thermostat 69 may be of any suitable type, for example bimetallic, bellows type, or remote bulb operated. FIG. 2 shows it as a remote bulb operated bellows unit. A decrease in the outdoor temperature will cause contraction of the charge contained within the remote bulb 77, suitably mounted out of doors, and within the bellows 78. This will cause a contraction of the bellows 78 and the central contact 260 will swing into engagement with contact 79, thereby carrying output from terminal 41 of the transformer through conductor 80 to terminal 10 of terminal strip T3. As previously noted, terminal 10 is directly connected to terminal 13 on terminal strip T4. The decrease in outdoor temperature has now caused output from terminal 41 of the transformer to be introduced at terminal 13 on terminal strip T4 hence through conductor 81 to contact A/H of the heating pole of selector switch 66. With the switch in its control position so that movable contact 70 is engaged with contact A/H, polarity 41 is introduced at contact 70 and via conductor 74 to terminal 14 of terminal strip T4. In the panel P, the circuit continues from terminal 14 through conductor 60 to relay R2, to provide polarity 41 at the latter giving the same effect as if the switch had been manually placed at position H. Pilot light 67 also is energized indicating that the system is now aligned for heating.

An increase in outdoor temperature will expand the charge within remote bulb 77 and bellows 78 causing the central contact 260 of switch mechanism 69 to engage terminal contact 82, passing the current from 41 of the transformer through conductor 83 to terminal 12 of terminal strip T3. In the panel P terminal 12 is directly connected to terminal 17 of terminal strip T4 and tracing the circuit on FIG. 2 from terminal 17 via conductor 84, it will be noted that the circuit terminates at the middle contact A/C on the cooling pole of selector switch 66. Since the selector switch is in the previously described position, wherein contacts A/H and A/C are engaged, current from terminal 41 of the transformer will travel to the movable contact 71 of the cooling pole 269, via conductor 85 to terminal 16 of terminal strip T4. Pilot light 68 will now light as transformer terminal 41 is connected to conductor 85 and transformer terminal 42 is still connected at conductor 75 through terminal 18 of terminal strip T4. From terminal 16 of terminal strip T4 the circuit continues in the panel through conductor 62 to one side of the coil of relay R1. The other side of this coil is connected to conductor 46, thence to terminal 42 of the transformer, thereby causing the relay to operate. Terminal 41 is still connected via conductor 45 to conductor 61 and with relay R1 energized, output from terminal 41 of the transformer crosses the lower contact 270 and 271, bridged by armature 272, to conductor 50 thence to one side of relay R3. The other side of relay R3 is also connected to conductor 53, as is the corresponding side of relay R4. Relay R3 cannot operate unless either relay R5 or relay R6 is energized, at which time the upper contacts of the energized one of these latter relays will connect conductor 53 through conductor 52 across the upper contacts of either relay R5 or R6; as the case may be, to terminal 42 of the transformer. The system would now be set to be aligned for the cooling operation, the circuit for polarity 41 being further traced from conductor 61 across the upper contacts 273 and 274 of relay R1, bridged by its armature 275, through conductor 48 to terminal 9 on terminal block T3, and from conductor 48 through conductor 276 to terminal 3' on terminal block T2, to terminal 3 on block T1 and to terminal 36 on terminal block T8.

Immediately clockwise of the central position, there is another "Off" position on both the heating pole and the cooling pole of selector switch 66, as indicated at 277 and 278, respectively. The furthest clockwise position 279 is unconnected on the heating pole but is indicated on the cooling pole as terminal C and the latter is connected to terminal 41 of the transformer from terminal 15 of terminal strip T4 via conductors 72 and 86 to terminal contact C on the cooling pole of the selector switch. With the switch set for movable contact 71 to engage contact C, output from terminal 41 is then introduced at the movable contact 71 via conductor 85 to terminal 16 of terminal strip T4 and from the latter to relay R1. This switch position therefore operates as a manually aligned cooling position, without benefit of automatic changeover, according to outdoor temperature. Pilot light 68 also lights and the further operation and sequence of the main panel is as described immediately above.

Figure 2A:
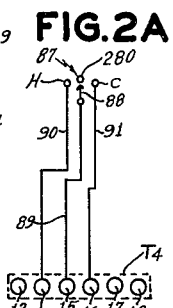
FIG. 2A is a view similar to FIG. 2 and illustrates a simpler manual selector switch and is one which does not utilize an automatic outdoor resetting device.

FIG. 2A illustrates a simple three position switch 87 which is utilized when a more economical installation is desired. This switch has a manual heat position at contact H, a central "Off" position at contact 280, and a manual cool position at contact C. The central movable contact 88 is connected via conductor 89 to terminal 15 on terminal strip T4. As previously noted, this terminal is connected to terminal 41 of the transformer so that turning the switch 87 to the H position introduces output from terminal 41 via conductor 90 to terminal 14 on terminal strip T4, to which the heating alignment relay R2 is connected, causing the latter to be energized. Turning the switch 87 to the C position introduces output from terminal 41 of the transformer from terminal 15 on block T4 via conductor 91 to terminal 16 of terminal strip T4 which is connected via conductor 62 to cooling alignment relay R1 which will then be energized to align the panel as a cooling system. Switch 87 has no provision for an outdoor resetting thermostat.

Figure 3:
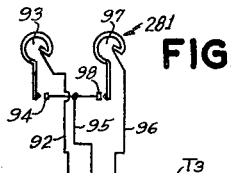
FIG. 3 is a wiring diagram of a temperature sensing device which is responsive to the temperature of a heating or cooling medium as it returns from the various zones and shows in phantom the connection of the leads to a terminal block of FIG. 1.

FIG. 3 illustrates the return water aquastat or duct thermostat 281 where a duct heating system is utilized. The sensing device 281 is located in the return water main (not illustrated) through which the water is being returned from the various zones, being positioned at a point before the water reenters the pump or boiler and chiller, the latter being conventional components and not illustrated. The device 281 is of conventional construction and, as here shown, is a dual sensing element type, permitting independent range adjustments for the heating and cooling elements. The sensing elements are arranged in such a manner that they cannot both contact cooperating stationary contacts in the device at the same time. As previously described when the heating alignment relay R2 in the panel P is energized, output from transformer 41 is introduced across the upper contacts 220—222 thereof through conductor 47 to terminal 7 on terminal block T3. Also as previously described, when the cooling alignment relay R1 is energized, output from terminal 41 of the transformer TR is introduced across the upper contacts 273—274 thereof through conductor 48 to terminal 9 of the terminal block T3. It has also been shown that relays R1 and R2 are energized independently of each other and that only one may operate at a time. Since conductor 92 is connected to terminal 7 on terminal block T3, output from terminal 41 of the transformer is carried thereby to the temperature sensing element 93 which is so designed that an increase in temperature causes the free end thereof to engage contact 94, permitting the continuity of current through conductor 95 to terminal 8 on terminal block T3 which, in the panel P is connected via conductor 63 to conductor 64. Conductor 63 is connected also via conductor 51 to terminal 37 of terminal block T8. Conductor 64 is connected to the normally open center contacts 282 and 283 of relays R5 and R6, respectively. If relay R6 is energized, output from transformer terminal 41 will cross the normally open contacts 283—284, bridged by armature 285 to conductor 58 which is connected to one side of the coil of a fan relay R8. It will be understood that relay R8, when energized, completes an operating circuit for the fan of a conventional fan-coil unit, or air handling unit, located in zone 1, relay R7 similarly controlling the energization of the fan of a fan-coil unit in zone 2. The other side of the coil on relay R8 is connected to conductor 46 which is attached to the terminal 42 of the transformer. Consequently, when the heating alignment relay R2 is energized, the panel is aligned as a heating system and current is supplied to terminal 7 of terminal block T3. The system at this time would be called upon to deliver heat to the various zones, but as long as the return water temperature has not been heated to the predetermined point for which sensing element 93 is set, the contact 94 on FIG. 3 would remain open, thereby preventing the fan relays R8 and R7 from operating. In this connection, it will be noted that one side of fan relay R7 is connected through conductor 46 to transformer terminal 42 and when its associated zone operating relay R5 is energized, the other side of relay R7 is connected through conductor 59 and contacts 286—282 of relay R5, bridged by armature 287, to conductor 63 and through the circuit described above to terminal 8 of block T3 so that relay R7 will not be energized until contact 94 is engaged by sensing element 93. This arrangement prevents cold air from being blown about in each zone and causing drafts until such time as the water returning from the zones is heated to the predetermined point for which the sensing element 93 is set, the latter then closing contact 94 and thereby permitting the fans for zone 1 or zone 2 to start, as called for by the energization of zone operating relays R6 and R5, respectively, as hereinafter described.

At such time as the system is aligned as a cooling system, by energization of relay R1, output from terminal 41 of the transformer is present at terminal 9 of terminal block T3, and it will be noted conductor 96 (FIG. 3) is attached to the temperature sensing element 97 whose stationary contact 98 is engaged by the free end of element 97 upon a decrease in temperature, permitting output from terminal 41 of the transformer to continue via conductor 95 to terminal 8 of terminal block T3. This arrangement again prohibits the operation of the zone fans when the system is aligned as a cooling system, until such time as the return water temperature from the zones has been reduced to the predetermined point at which the sensing element is set to engage contact 98. This procedure prevents the fan in each zone from distributing heat during such time that cooling is actually called for.

Figure 3A:
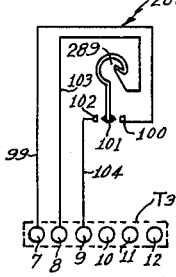
FIG. 3A is a view similar to FIG. 3 and illustrates a modified form of sensing device.

FIG. 3A illustrates a sensing device 288 which serves a function similar to device 281. Thermostatic element 289 of device 288 is normally engaged at its free end, or contact 101, with either contact 102 or contact 100. The terminal 7 of terminal block T3 is connected via conductor 99 to terminal 100 of the sensing device. A rise in water temperature will close contacts 101 and 100 at the same time that contacts 101 and 102 are opened. Current will then flow through engaged contacts 101 and 100 and will pass through conductor 103 to terminal 8 of terminal block T3 in a manner similar to that described in connection with device 281. When the system is aligned as a cooling system, output from terminal 41 of the transformer will be connected to terminal 9 of terminal block T3 and will pass along conductor 104 and a decrease in the temperature of the returning water will close contacts 101 and 102 permitting the current to flow through conductor 103 and back to terminal 8 of terminal block T3. The functioning of device 288 is similar to device 281, with the exception that a single thermostatic element is utilized in device 288 and the contact 101 moves directly from contact 100 to 102, or vice versa, without the possibility of having an intermediate "Off" position, as might be done with the device 281 shown in FIG. 2. In this connection, it will be noted that in sensing device 281, both of the stationary contacts 94 and 98 may be in simultaneous disengagement from their associated thermostatic elements, in accordance with the settings of the latter.

Figure 4:
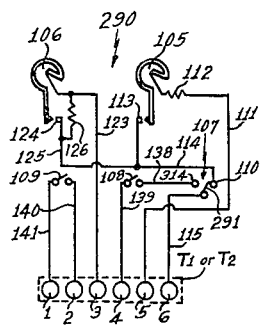
FIG. 4 is a wiring diagram of a zone thermostat which provides maximum control of a zone and shows in phantom the connection of the leads to a terminal block of FIG. 1.

FIG. 4 illustrates a zone thermostat device 290, which may be connected to terminal block T1 or T2 depending on whether this thermostat is to be used in zone 1 or zone 2. The thermostat 290 illustrated here includes two separate sensing elements, a heating element 105 and a cooling element 106, which are interlocked to prevent simultaneous operation thereof. The device 290 also incorporates a system "On-Off" switch 107 which is actually a double throw switch, the "Off" contact being utilized as a feed through from a dehumidification timer switch 108. The sensing device 290 also contains a manual fan control switch 109 which may be utilized to provide a continuous fan operation for that zone. There will first be described the operation of thermostat 290 on a heating cycle with the fan switch 109 in its "Off" position, as illustrated, with the dehumidification timer switch 108 to its "Off" position, as illustrated, and with the system switch in its "On" position or against contact 110. As previously described, when relay R2 has aligned the control panel for a heating operation, current from terminal 41 of the transformer is carried via conductor 47 to terminals 5' and 5 of terminal blocks T2 and T1, respectively. To simplify the description, it is assumed that thermostat 290 is in zone 1 and is connected to terminal block T1 of the panel P. When the panel is aligned as a heating panel, the output at terminal 41 of the transformer has been connected to terminal 5 of terminal block T1 or T2, and is carried via conductor 111 to the heating bimetal 105 in series with a conventional heat anticipator resistor 112. The fall in temperature will cause the free end of the bimetal to engage contact 113 permitting the current to flow through conductor 114, through contact 110 on the system switch 107, which is engaged by the movable contact 291 thereof, and through conductor 115 to terminal 6 on terminal block T1. As shown in FIG. 1, output from terminal 41 of the transformer is available at terminal 6 of terminal block T1 from which is carried by conductor 65 to one side of the zone 1 operating relay R6. The other side of zone 1 operating relay R6 is connected by means of conductor 46 to terminal 42 of the transformer; relay R6 therefore operates and pulls in. On doing so the bridged upper contacts 253—256 of relay R6 connect conductor 52 to terminal 42 of the transformer and current from the latter flows via conductor 53 to one side of relays R3 and R4. As the heating alignment relay R2 has been energized output from terminal 41 of the transformer has been carried via conductor 61 across the lower bridged contacts 221—224 of relay R2 to conductor 49 thereby causing relay R4 to operate. Relay R3 remains inoperative due to the fact that relay R1 is inoperative. The closing of the contacts of relay R4 causes the operation of any heating equipment connected to terminals 23 through 26 on terminal block T6, it being noted that the lower contacts 292—293 of the relay are connected through conductors 164 and 165, respectively, to terminals 23 and 24, respectively, and the upper contacts 294 and 295 are connected by conductors 162 and 163, respectively, to power input terminal S1 and to terminal 26, respectively. Simultaneously, as relay R6 became energized, the closing of its lowest contacts 296 and 297 permits current to flow from power terminal S1 of terminal block T5 through conductor 116 and across said lowest contacts through conductor 117 to terminal 30 on terminal block T7. A 115 volt power operated or solenoid valve located in the water line to the water coil, as hereinafter described, for zone 1, and wired across terminals 30 and 31 of terminal block T7 would thereupon operate, permitting the flow of water through the water coil of the fan-coil unit of zone 1. Conventional boiler and circulating pumps connected to terminal block T6, as hereinafter described, are also operated by relay R4. The central set of contacts 283—284 of relay R6 have closed across conductors 64 to 58, but until such time as the return water temperature has been raised to the predetermined level, conductor 64 does not carry current. As the return water is heated, the return water aquastat illustrated in FIGS. 3 and 3A, closes across terminal 7 to terminal 8 on terminal block T3, permitting the flow of current from transformer terminal 41 through conductors 63 to 64 and across the normally open central contacts 283—284 of relay R6 to conductor 58, thence to one side of the coil of relay R8; the other side of the latter being connected to conductor 46 and to terminal 42 of the transformer, thereby causing relay R8 to be energized. Power from power terminal S1 is then introduced across the contacts 298—299 of relay R8 via conductor 116 to conductor 118 to the terminal 32 of terminal block T7. A fan located at zone 1, and connected across terminals 31 and 32, as hereinafter described, would then operate to distribute heated air.

Connecting a thermostat 290 to terminal block T2, in the same manner as described above for connection to block T1, and locating it in zone 2, would cause it to provide current from the transformer terminal 41 at terminal 6' on terminal block T2 during a call for heat, the element 105 closing at contact 113. Relay R5 would operate as current would be taken to one side of it through conductor 119, the other side of the coil of relay R5 being connected to terminal 42 of the transformer by means of conductor 46. The top set of contacts 252—254 of relay R5 again introduces output from transformer terminal 42 to conductor 52 and thence to 53 as it did with relay R6. The normally open central contacts 282—286 of relay R5 are in circuit with transformer terminal 41 from terminal 8 of terminal block T3 via conductors 63 and 64 in a manner described hereinbefore; and output from terminal 41 being then introduced across the normally open contacts 282—286 to conductor 59 and thence to one side of fan relay R7, the other side of which is connected to transformer terminal 42 via conductor 46. The lowest set of contacts 308—309 on relay R5 is connected to the power supply terminal S2 on block T5 via conductor 119 and passes the current to conductor 120 which is connected to terminal 27 on terminal block T7. A power operated or solenoid valve located in the water line at a fan-coil unit in zone 2, as hereinafter described, and wired across terminals 27' and 28 of terminal block T7 will thereby cause the valve to open and the water to flow through the coil. The water temperature, having already been raised, has permitted relay R7 to close and power from terminal S2 of terminal block T5 is introduced through conductor 119 and crosses the contacts 310—311 of relay R7 to conductor 121 which is connected to terminal 29 on terminal block T7; the fan, in zone 2, connected across terminals 28 and 29 of terminal block T7 will now be permitted to operate.

When the system is aligned as a cooling system, it has been noted that relay R1 passes output from terminal 41 of the transformer via conductor 50 to relay R3 and via conductor 48 to terminal 9 of terminal strip T3, to terminal 3' of terminal strip T2 and to terminal 3 of terminal strip T1. Considering that the system is aligned as a cooling system, and utilizing the same thermostat in zone 1 as illustrated in FIG. 4 we note that we now have output from terminal 41 of the transformer introduced at terminal 3 of terminal strip T1 instead of at terminal 5 of this same terminal strip. This current is carried via conductor 123 to the cooling thermostatic element 106 and by it through contact 124, engaged thereby on a rise of temperature in the zone, through conductor 125 to conductor 114, to contact 110 on system switch 107, through switch arm 291 and via conductor 115 to terminal 6 on terminal strip T1. A conventional "cold" anticipator 126 is shown installed in parallel across contact 124 and the cooling sensing element 106. This "cold" anticipator is a small resistance which become operative only during the "Off" cycle of the thermostatic element. Its purpose is to add heat to the thermostatic element during an "Off" cycle thereby decreasing the effective differential of the thermostat.

Figure 5:
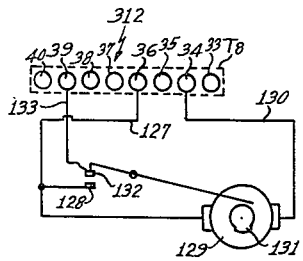
FIG. 5 is a wiring diagram of a dehumidification timer operated by low voltage control current and shows in phantom the connection of the leads to a terminal block of FIG. 1.

In order to describe the operation of the dehumidification timer switch 108 included in thermostat 290, it will be necessary to describe the operation of the dehumidification timer 312 illustrated in FIG. 5. As indicated previously, when the cooling alignment relay R1 is operating, output from terminal 41 of the transformer is introduced to conductor 48 which finally terminates at terminal 36 on terminal block T8. As shown in FIG. 5, the circuit continues from terminal 36 of terminal strip T8 through conductor 127 to a stationary contact 128 as well as to a conventional timer motor 129. As previously noted, output from terminal 42 of the transformer is fed into conductor 46 which terminates at terminal 34 of terminal block T8. From the terminal 34 the circuit continues through conductor 130 to the other side of the timer motor 129. With this connection the timer motor will operate at any time that the control panel is aligned for cooling. Cam 131, operated by motor 129, has an adjustable "On-Off" cycle which will determine the percentage of time that the movable contact 132 is engaged with the stationary contact 128. When these contacts are closed, ouput from transformer terminal 41 will be conducted across said contacts to conductor 133 and thence to terminal 39 of terminal strip T8. The circuit continues on FIG. 1 from terminal 39 of terminal strip T8 via conductor 54 to terminal 4 and terminal 4' of terminal strips T1 and T2, respectively. The timer operates therefore to introduce output from terminal 41 of the transformer to terminals 4 and 4' of terminal block T1 and T2, respectively, only during such time as the control system is aligned for the cooling operation.

Figure 5A:
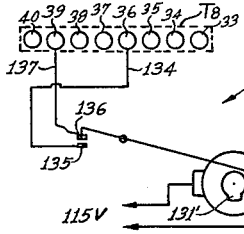
FIG. 5A is a view similar to FIG. 5 and illustrates a dehumidification timer operated by line voltages.

FIG. 5A illustrates a dehumidification timer 313 serving the identical function, but provided with a clock motor 129' operating continuously off line voltages. Output from transformer terminal 41 is again introduced, when the panel is aligned for cooling, at terminal 36 of terminal block T8 via conductor 134 to the stationary contact 135, to the movable contact 136 and to terminal 39 of terminal block T8 via conductor 137.

Referring back to FIG. 4, it is noted that terminal 4 of terminal block T1 is being fed output from terminal 41 of the transformer only during the cooling alignment of the panel and for a fixed percentage of time against the cycle dictated by the number of revolutions per hour of the cam 131 or 131'. Under these circumstances, if the system switch 107 is placed to the "Off" position, by engagement of switch arm 291 with contact 314, it becomes connected via jumper 138 to the dehumidification timer switch 108. Output from terminal 41 of the transformer is provided at terminal 4 on terminal block T1 and is supplied to the dehumidification timer switch 108 via conductor 139. When the dehumidification timer switch is closed, output from transformer terminal 41 is supplied through conductor 138, through system switch 107 closed at contact 314, through conductor 115 to terminal 6 of terminal block T1. This completes the circuit for the relay R6 which will cause the entire system to operate just as if the thermostat had called for cooling. These short periods of definite "On" as against a greater percentage of definite "Off" will be utilized in zones where secondary equipment is installed for cooling, during such times as the zone is not occupied and one wishes to effect some degree of humidity reduction.

As previously noted, output from terminal 41 of the transformer is conducted directly by conductor 45 to terminal 2 and 2' of terminal blocks T1 and T2, respectively. Referring to FIG. 4, the current flows from terminal 2 through conductor 140 to the manual fan switch 109, when closed, through conductor 141 and back to terminal 1 of terminal block T1. The circuit continues in FIG. 1 from terminal 1 of terminal block T1 through conductor 55 to the normally closed contacts 315—316 on the central terminals of relay R6. At such time that relay R6 is inoperative, and when the manual fan switch on the thermostat is closed, the current will flow from conductor 55 across the normally closed contacts 315—

316, through conductor 58, to one side of relay R8; the other side of relay coil R8 is connected to conductor 46 which is, in turn, connected to terminal 42 of the transformer. Under these circumstances relay R8 will operate, causing line voltage to travel from terminal S1 through conductor 116 across the contacts of relay R8 to conductor 118, thence to terminal 32 of terminal block T7 which will operate the zone 1 fan, wired across terminals 31 and 32 of terminal block T7. In the event that the manual fan switch 109 is closed at such time that relay R6 becomes operative, the manual fan switch loses its control of the fan relay R8 in order to prevent the fan from blowing air of a temperature contrary to the setting of the thermostat.

The foregoing description of the operation of a thermostat unit 290 located in zone 1 and connected to terminal strip T1 is equally applicable to a thermostat unit 290 located in zone 2 and connected in the same manner to terminal strip T2. In the latter case, the relays R5 and R7 would function in response to the operation of the associated thermostat unit 290 in the same manner as described in connection with the functioning of relays R6 and R8 in response to their associated thermostat unit 290. It will be noted that terminal 1' of terminal block T2 is connected via conductor 57 to the normally closed contacts 317—318 of relay R5. There is, however, one significant difference between the connections of terminal 1 and terminal 1' from terminal blocks T1 and T2 respectively; this difference being that an additional conductor 56 meets a junction with conductor 55, and this additional conductor 56 terminates at terminal 40 of terminal strip T8. The function of this terminal will be explained later.

Figures 4A, 4B:
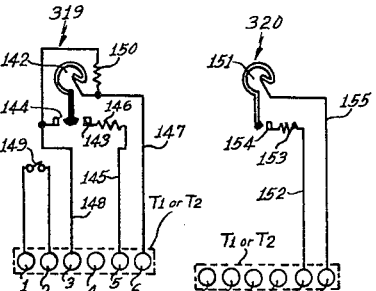
FIG. 4A is a view similar to FIG. 4 and illustrates a simpler heating and cooling thermostat for a more economical installation.
FIG. 4B is a view similar to FIG. 4 and illustrates a simple heating thermostat for a zone requiring heating alone.

FIG. 4A illustrates a sensing device 319 having a single pole double throw thermostatic element 142 which closes against contact 144 on a rise in temperature, said element being normally engaged with one or the other of said contacts. During a heating cycle, output from terminal 41 of the transformer is introduced through terminal 5, thence through conductor 145, through the heat anticipator 146 across engaged terminal 143 and via conductor 147 to terminal 6 of terminal block T1 or T2. During the cooling cycle output from transformer terminal 41 is introduced from terminal 3 through conductor 148 across engaged contact 144, through the thermostatic element and to terminal 6 of terminal block T1 via conductor 147. Manual fan switch 149 operates in identical manner to that described for fan switch 109 of FIG. 4. "Cold" anticipator 150 operates in identical manner to anticipator 126 as described for FIG. 4.

FIG. 4B shows a heating thermostat 320 having a sensing element 151 which is connected across terminal 5 and terminal 6 of terminal block T1 via conductor 152 through heat anticipator 153 across engaged contact 154, returning to terminal 6 of terminal block T1 through conductor 155. This thermostat when element 151 is closed at contact 154, will operate only the heating equipment connected to terminals 23 through 26 on terminal block T6, as well as operating whatever zone equipment is required for function in the zone in which the thermostat is located.

Figure 4C:
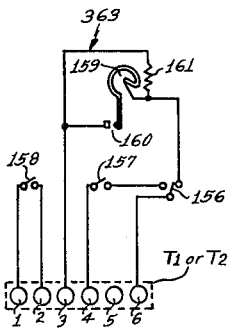
FIG. 4C is a view similar to FIG. 4 and illustrates a cooling thermostat for a zone not equipped for heating.

FIGURE 4C illustrates a cooling thermostat 363 which is utilized where heating is not wanted for a particular zone. The drawing illustrates a system "On-Off" switch 156, a dehumidification timer switch 157 and a manual fan switch 158. These switches each serves an identical function to the corresponding switches 107, 108 and 109, respectively, of FIG. 4; and, they may be omitted on a simpler version of a cooling thermostat if it is so desired for economy sake. The cooling thermostatic element 159 closes at contact 160 on an increase of temperature. "Cold" anticipator 161 serves the same function as anticipator 126 in FIG. 4, and it may be omitted where desired.

The thermostats in each of zones 1 and 2, which will be connected to terminal blocks T1 or T2, may be identical or they may be different, as required for the particular zone they are serving. This system permits the installer to be completely flexible with his installation.

Figure 6:
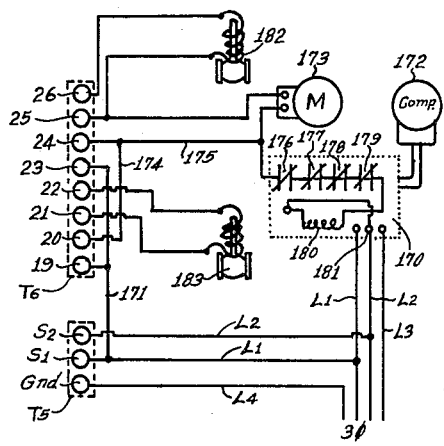
FIG. 6 is a wiring diagram of a water circulating type heat-pump and shows in phantom the connection of the leads to terminal blocks of FIG. 1.

FIGS. 6 through 6H illustrate line voltage connections for the primary equipment. FIG. 6 illustrates the connections utilized for a heat pump installation having a circulating water system for distribution of the heating and cooling effect to the various zones. As previously described, any time that the panel P is aligned for heating, and if any zone thermostat calls for heating, the main heating relay R4 will operate. Power input from terminal S1 of terminal block T5 is carried along conductor 116 through conductor 162 and across the upper contacts 294—295 of relay R4 through conductor 163 to terminal 26 of terminal block T6. The lower contacts 292—293 of relay R4 operate as a simple switching mechanism. For example, conductor 164 is connected between terminal 23 of terminal block and the lower terminals 292—293 of relay R4 and then to conductor 165 which is connected to terminal 24 of terminal block T6. The same type of operation takes place through relay R3, introducing power from terminal S1 of terminal block T5 through conductor 116, through conductor 166 across the upper contacts 364—365 of relay R3 through conductor 167 to terminal 22 on terminal block T6. The lower contacts 366—367 of relay R3 are utilized as a simple switch mechanism connecting terminals 19 and 20 of terminal block T6 by means of conductors 168 and 169, respectively.

Referring to FIG. 6, there is shown a three phase power line, having the fourth ground wire L4 connected to the "GND" terminal of terminal block T5, with line L1 of the power leg connected to S1 and the line L2 power leg connected to S2 to power block T5. The three power legs L1, L2 and L3 continue for their connection to a conventional compressor motor starter 170. A jumper 171 is installed from terminal S1 of terminal block T5 and is connected to terminals 19 and 23 of terminal block T6. FIG. 6 features a conventional heat-pump system having a compressor indicated by the reference numeral 172. A compressor on a heat pump operates both during the heating and cooling cycles, as does the associated circulating pump 173 which circulates the water to the various zones after it has been heated or chilled by the heat pump. A jumper 174 is connected between terminals 20 and 24 of terminal block T6 in order to effect the operation of the heat pump compressor and the circulating pump during both heating and cooling cycles. Conductor 175 which is connected to these terminals is in circuit with power terminal S1 and power line L1, through the switching arrangements provided by the bottom contacts of relays R3 and R4. The circulating pump 173 is connected across power line 175 and terminal 25 of terminal block T6, which is a ground connection, giving the circulating pump 115 volts for its operation. The magnetic motor starter 170 for the three phase compressor motor 172 is installed within the heat pump, and includes such items as an aquastat 176, a high pressure cut out 177, a low pressure cut out 178, a freeze safety switch 179, and any other controls which the equipment manufacturer may wish to incorporate. Also included at this point are magnetic overload relays, oil pressure failure switches, temperature or pressure differential switches, etc. Power from line L1 having been introduced into the starter through conductor 175, passes in series through the aforementioned controls and then through the starter relay coil 180, the other side of which is connected to a terminal 181 to which line L2 is connected. Therefore, closing of either the heating or cooling relays R4 or R3, respectively, will cause compressor 172 and circulating pump 173 to operate. Reference numeral 182 indicates a power actuated refrigerant changeover valve which must be operated in order to cause the heat pump to operate as a heating unit. As here shown, the valve is of the solenoid type and its coil is wired to terminal 26 and terminal 25, thereby obtaining 115 volts for its operation at any time that relay R4 operates. A second changeover valve 183 of the solenoid type, has its coil connected to terminals 21 and 22 of terminal block 26 and therefore receives 115 volts to operate at any time that cooling relay R3 operates. Some heat pumps utilize a single three way solenoid valve and therefore either 182 or 183 would be eliminated in that case.

Figure 6A:
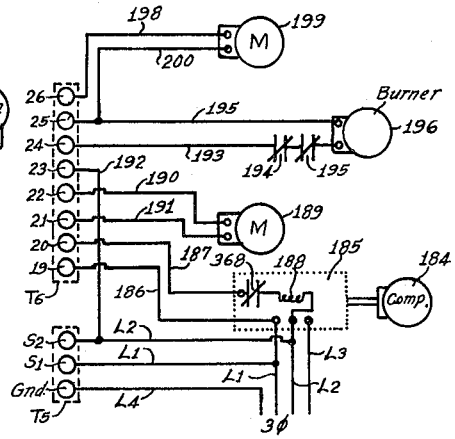
FIG. 6A is a view similar to FIG. 6 and illustrates a boiler-chiller system having a separate circulating pump for the boiler, or heating cycle, and a separate circulating pump for the chiller, or cooling cycle.

FIG. 6A represents a system utilizing a conventional boiler and a chiller for the purpose of heating or cooling the water which will be circulated to the various zones. In this installation the boiler and chiller are each equipped with its own circulating pump. This procedure is most usually followed where the quantities of circulated water differ as to the requirement for the heating and cooling cycles. The chiller compressor 184 may again be a three-phase motor, or single phase, by omitting the power leg L3. The motor starter 185 is included in the chiller equipment and, as indicated by this figure, is connected through conductor 186 to terminal 19 of terminal block T6. Referring to FIG. 1, the circuit can be traced through conductor 168 and across the bottom contacts 366—367 of relay R3, through conductor 169 to terminal 20 of terminal block T6, and on FIG. 6A via conductor 187 back to the starter 185 where it passes in series through conventional high pressure cut outs, low pressure safeties, overload relays, freeze safety switches, etc., generally indicated by reference 368 and through the magnetic winding of the activating solenoid 188, and the other side of this coil is connected to power lead L2, thereby putting a 220 volt potential across the coil 188 at any time that the cooling relay R3, showing in FIG. 1, is operating; compressor 184 would then also be operating. Circulating pump 189 is utilized at any time the cooling system is operative, for as previously described, when relay R3 operates, the upper contacts 364—365 thereof connect terminal 22 of terminal block T6 to terminal S1 of terminal block T5. Since circulating pump 189 is connected via conductor 190 to terminal 22 and via conductor 191 to terminal 21 of terminal block T6, a 115 volt potential will cause the circulating pump to operate. As previously described, when the heating relay R4 operates, terminal S1 of terminal block T5 becomes connected to terminal 26 of terminal block T6, and terminal 23 becomes connected to terminal 24 on terminal block T6. Therefore, by placing a jumper 192 from terminal S2 of terminal block T5 to terminal 23 of terminal block T6, operation of the heating relay R4 controls the application of the L2 power line to terminal 24 of terminal block T6. On FIG. 6A, there can be traced the L2 power input through conductor 193 through a stack switch 194 and the limit switches 195 to the oil burner motor 196. The other side of the oil burner motor is connected via conductor 197 to terminal 25 on terminal block T6. This terminal is a ground connection, as previously indicated, thereby giving 115 volt potential across oil burner motor 196 at any time that heating relay R4 is operating. Simultaneously, as previously noted, power input from line L1 has been carried from terminal S1 of terminal block T5 across the upper contacts 294—295 of heating relay R4 to terminal 26 of terminal block T6, through conductor 198 to the heating circulating pump 199, the other side of which is connected via conductor 200 to the ground terminal 25; this permits circulating pump 199 to operate at any time that heating is required of the system. In the event that a gas-fired boiler is used rather than an oil-fired boiler, the oil burner motor 196 will be replaced by an electrically operated gas valve, and stack control switch 194 would be replaced by the proper safety controls utilized for gas operated equipment.

Figure 6B:
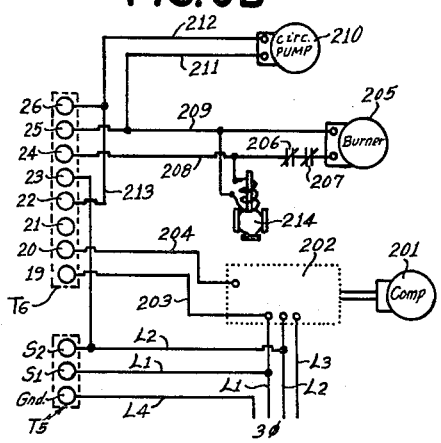
FIG. 6B is a view similar to FIG. 6 and illustrates a boiler-chiller system utilizing a single common circulating pump for both the heating and cooling cycles and including a change-over valve to divert the flow of water during the heating cycle.

FIG. 6B is a system similar to that shown in FIG. 6A and comprises a compressor 201 which is connected through starter 202 to the three phase power line and by means of conductors 203 and 204 to terminals 19 and 20 of terminal block T6. The oil burner 205, the stack switch 206, and limit switch 207 are connected to terminals 24 and 25 of terminal block T6 via conductors 208 and 209 in a manner identical to the oil burner installation shown by FIG. 6A. However, a single circulating pump 210 is utilized for this installation instead of the two separate circulating pumps illustrated in FIG. 6A. Pump 210 is a 115 volt unit and is connected to terminals 25 and 26 on terminal block T6 in the same manner in which circulating pump 199 was utilized in FIG. 6A. The ground connection from terminal 25 of terminal block T6 is connected to the circulating pump 210 via conductor 211, and the other leg is connected via conductor 212 to terminal 26 of terminal block T6. A jumper 213 is connected also to conductor 212 and terminates at terminal 22 of terminal block T6. Therefore, when the heating relay R4 operates power from line L1 is introduced at terminal 26 thence to circulating pump 210 causing it to operate; if, however, cooling relay R3 operates, power from line L1 is introduced at terminal 22 of terminal block T6, also causing the operation of this same circulating pump 210 through conductor jumper 213. The necessary water piping connections would include a three-way solenoid or motor operated valve installed so that, with the solenoid deenergized, the flow of water through the three-way valve would be by way of the cooling equipment. Therefore, it becomes unnecessary for this valve to be energized at such time when the cooling equipment is operative. It does become necessary for it to be energized during the heating cycle and therefore valve 214 is connected in parallel with the oil burner 205 across conductor 208 and 209. It is to be noted that this valve is connected before installation of stack switches and boiler limit switches 206 and 207, or any other boiler limit switches, so that internal cycling of the boiler will not effect the control of the solenoid valve 214. Oil burner 205 and its associate control switches 206 and 207 may be replaced by an electric control valve for a gas burner and limit switch or other safety devices as required for that installation.

Figure 6C:
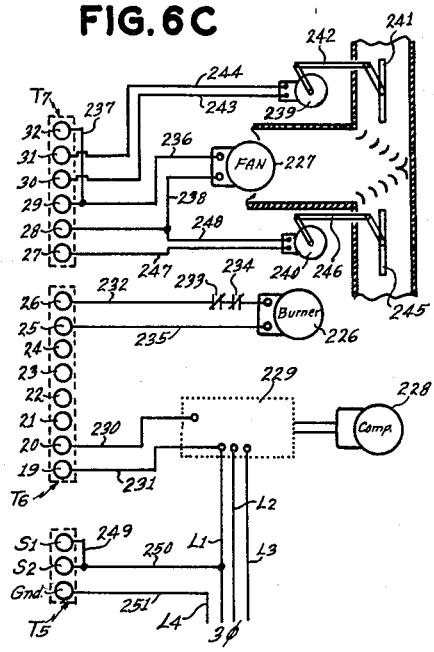
FIG. 6C is a view similar to FIG. 6 and illustrates a single duct system utilized for both heating and cooling, the air being heated by a direct heat exchanger means from an oil or gas fired burner, and the air being cooled by a direct expansion cooling coil, located immediately after the furnace unit.

FIG. 6C illustrates an installation using a single duct system fired by an oil burner 226 and having an internal fan 227, which is utilized for circulating the air for both heating and cooling. According to the system, a conventional direct expansion refrigerant cooling coil is placed in the discharge plenum from the furnace, fan motor 227 would therefore also operate for the cooling cycle as well as compressor 228. The magnetic starter 229, located within the air conditioner, is controlled by the lower contacts of the cooling relay R3 through terminals 19 and 20 of terminal block T6 and by conductors 230 and 231, operating as a normal two wire control. The oil burner motor 226 is controlled by the top contacts of relay R4 via terminal 26 of terminal block T6 through conductor 232 and stack and limit switches 233 and 234. The other side of the motor 226 is connected to ground terminal 25 on terminal block T6 via conductor 235. The fan motor 227 is connected via conductor 236 to terminal 29 of terminal block T7, this being the fan connection for zone 2. Jumper 237 is used to connect from terminal 29 to terminal 32 of terminal block T7. This jumper causes line voltage to be applied to conductor 236 whether activated by zone 1 controls or by zone 2 controls. The other side of the fan motor is connected via conductor 238 to ground terminal 28 of terminal block T7. A fan control switch, such as illustrated in FIG. 3A, is to be utilized and this switch is to be installed with the sensing element located in the plenum above the furnace in the usual manner of the standard furnace fan switch. Its operation at that location is such that it prevents cold air from circulating within the building until such time as the heat output from the furnace has increased and has operated the switch closing contact 101 on FIG. 3A; fan motor 227 on FIG. 6C would then be permitted to operate. If the system is aligned for cooling and the temperature of the plenum is lower than that required for heating, contact 102, as shown on FIG. 3A, would be closed, thereby permitting fan 227 of FIG. 6C to operate on a demand for cooling from either zone. It is to be further noted that with this particular connection the manual fan switch connected to terminals 1 and 2 and 1' and 2' of terminal blocks T1 and T2, respectively, are not to be utilized, as the conventional zone damper motors 239 and 240 would not be operating. Zone damper motor 239 controls damper 241 through linkage 242 and is spring loaded in a normally closed position; current for operation of the motor is via conductors 243 and 244 from terminals 30 and 31 of terminal block T7. Damper motor 240 controls damper 245, located in the zone 2 duct work via linkage 246 and receives power for its operation through conductors 247 and 248 from terminals 27 and 28 of terminal block T7. This damper is also spring loaded to the closed position and the motor operates it open to a stalled stop. Compressor motor 228 may again be either single or three phase as required for the installation; it is however vital that the control panel be connected only for 115 volt operation as jumper 237 between terminals 29 and 32 of terminal block T7 would short circuit phase legs L1 and L2 in the event that 115/230 volt three-wire current were introduced to the panel. Therefore, the jumper 249 must be used for this connection between terminals S1 and S2 on terminal block T5. When the power phase leg L1 is connected via conductor 250 to terminal S1 and the incoming ground leg is connected via conductor 251 to the "GND" terminal of terminal block T5, the correct polarities will exist throughout the entire panel.

Figure 6D:
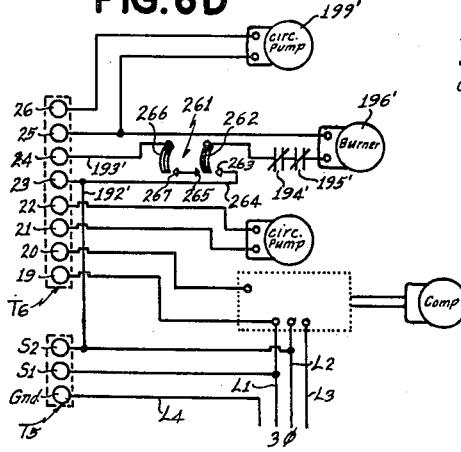
FIG. 6D illustrates a modification of FIG. 6A, the boiler being utilized for maintaining a supply of domestic hot water during the year around, and the boiler temperature being increased automatically during any demand for heating.

FIG. 6D is identical in design, installation and scope to FIG. 6A, with one exception, that exception being the addition of a two stage aquastat or sensing device 261 located in the boiler and in series in conductor 193' with a stack control switch 194' and a high limit aquastat 195', which are identical to those utilized in the same position of FIG. 6A. The function and use of the two-stage aquastat 261 is to permit the use of the boiler as a supply of domestic hot water during the normally "Off" or summer season, or in the event that the boiler of the heating system is too large, in mass, or contains too much water to heat rapidly on a demand for heating. During this "Off" season, oil burner 196' would be operated by the lower temperature element 262 through contact 263 via conductor 264 from terminal 23 of terminal block T6, the point at which the power input for the boiler is introduced as shown in FIG. 6A by conductor 192. Conductor 264 connects with conductor 192' for this purpose. The water temperature normally required for domestic hot water is approximately 140° and upon reaching this temperature, the low temperature sensing element 262 would open contact 263 and close to contact 265. During the "Off" or no heating required period, the heating relay R4 would be inoperative and therefore current could not pass from terminal 23 to terminal 24 on terminal block T6. However, during a demand for heating, line voltage would be introduced at terminal 24 of terminal block T6 making this current (the same phase leg carried by conductor 192') available to the high temperature control element 266. Now again supposing that the predetermined setting of the low temperature element 262 has been met, it would engage contact 265. In the event that the setting of the high temperature element 266 has been satisfied, contact 267 would be open and no current would flow. As the setting of the high temperature element 266 became unsatisfied, contact 267 would close and the flow of current would now be across contact 267, across contact 265 through the low temperature sensing element 262, and to oil burner motor 196'. In the event that all zone thermostats are satisfied, heating relay R4 becomes inoperative, thereby disconnecting the power from terminal 24 of terminal block T6, and automatically giving control to sensing element 262 for the purpose of maintaining the temperature of the boiler and its contained water at the predetermined setting of sensing element 262. It is to be noted that circulating pump 199' still opertaes only upon a demand for heating and operation of relay R4, and is not interfered with in any way by the introduction of this new two-stage aquastat 261. All other connections, controls and equipment in this FIGURE 6D are identical to those illustrated in FIG. 6A.

FIG. 6E illustrates a system identical with that of FIG. 6B, with the exception that a dual aquastat 301 has been installed in the boiler to permit burner 205' to be operated during an "Off" heating cycle or during alignment of the panel for cooling. This permits its use for domestic hot water or to maintain a minimum temperature in the boiler in the event of excessive mass and water content. The installation shown by FIG. 6E also includes a single circulating pump 210' which is utilized for both the heating and cooling cycles and a three-way solenoid valve 214' is used. The three-way valve 214' must be energized at any time that the burner 205' is to be utilized for heating, although it must not be energized at any other time. The connections illustrated here permit this to take place with no possibility of a cross control situation. Line voltage power is introduced at terminal 23 of terminal block T6 in a like manner to FIG. 6B. During the "Off" cycle there is no continuity from terminal 23 to terminal 24 of terminal block T6; during this period line voltage would be carried via conductor 302 to contact 303, and in the event that the setting of low temperature sensing element 304 is unsatisfied, line voltage would be conducted to the burner 205' through stack and high limit switches 206' and 207', respectively. When the temperature within the boiler would reach the setting of low temperature sensing element 304, contact 303 would open and contact would be made to contact 305; since no power is being introduced at terminal 24 of terminal block T6, no current could flow through the high temperature sensing element 306 even though it might be in an unsatisfied position having contact 307 in a closed position. In the same manner, cross controlling of the three-way valve 214' is impossible as both sides of valve 214' and oil burner motor 205' would be connected via conductor 209' at their junction 308. With low temperature sensing element 304 in a satisfied position, contact 305 would be closed, and with high temperature sensing element 306 in an unsatisfied position contact 307 would be closed. In the event that the system became aligned for heating and any zone called for heating, relay R4 would operate providing continuity for the phase leg from terminal 23 to terminal 24 of terminal block T6, causing the three-way valve 214 to operate immediately as well as causing circulating pump 210' to operate immediately; the same phase leg which is operating the valve 214' would then pass through the high temperature sensing element 306, through contact 307 across contact 305 through low temperature sensing element 304, and through the stack and high limits which is 206' and 207' causing burner 205' to operate. On a maintained call for heating from the zones, but with satisfaction of the high temperature sensing element 306, contact 307 would open causing burner 205' to stop. However, circulating pump 210' and valve 214' would continue operating, circulating the heated water within the boiler and system to the various zones as required. High temperature sensing element 306 would then cycle "On" and "Off" maintaining the water in the system at the higher temperature desired for heating. It is to be noted that element 306 may be the type of aquastat which adjusts its water temperature setting according to the outdoor temperature and outdoor demand. All other connections, descriptions and equipment as described for FIG. 6B hold true for FIG. 6E and are to be considered as describing FIG. 6E.

FIG. 6F shows connections which may be utilized for a combined system having a forced air heating furnace including an oil burner 321 and a central fan 322 distributing the heated air through a duct system to the various zones. Cooling for the system is done by means of a conventional chilled water unit including compressor 323, and which has a circulating pump 324 to circulate the chilled water to the various zones. The system shown would have fan coil units having, for zone 1, a solenoid valve 325 to control the flow of chilled water through the coil and a zone fan 326 for distributing the air within that zone; and for zone 2, a solenoid valve 327 and a zone fan 328. Also illustrated is a switch 329 to give manual continuous fan operation for zone 1 and a similar switch 330 for the purpose of maintaining continuous fan operation manually for zone 2. The principle involved in operation of this combined type of system is that it is possible to control both legs, the high voltage leg and the ground leg, of an electric circuit, thereby giving an end result depending upon the combination of factors, rather than upon operation of a single relay or control.

The primary equipment, consisting of the oil burner 321, the compressor 323, circulating pump 324 and central fan 322, are controlled directly by relays R3 and R4 on the high voltage leg of the circuit. Secondary equipment consisting of solenoid valves 325 and 327, zone fans 326 and 328, and zone damper motors 331 and 332, are controlled on both the high voltage leg and the ground legs. The operation of the secondary equipment is controlled by the terminal connections to terminal block T7, on the high voltage leg of the circuits, insofar as which zone shall be operating. The ground legs of the zone equipment are connected to terminals 24 and 20 on terminal block T6 in order to control the selection of heating zone equipment or cooling zone equipment. Conductor 333 is connected from the ground terminal on terminal block T5 to terminals 19 and 23 of terminal block T6. Therefore, upon operation of the heating relay R4 continuity is established between terminals 23 and 24 of terminal block T6, thereby permitting the ground side of the circuit to continue from terminal 24 of terminal block T6 through conductor 334 to the ground terminals of damper motor 332 for zone 2 and to the ground terminal of damper motor 331 for zone 1. At the same time that this continuity has been established power from terminal S1 of terminal block T5 has been conducted across the uppermost contacts of relay R4 to terminal 26 on terminal block T6 via conductor 335 to oil burner motor 321 across stack switch and limit switch 336 and 337. Simultaneously, conductor 338, which is connected to conductor 335, carries power across fan switch 339, which is located in the plenum above the furnace and across an optional proportioning fan switch 340 which may be used to control the speed of fan 322 according to the pressure located in the plenum above the furnace to the high voltage connection of central fan 322. The ground connection of this fan motor is connected via conductor 341 to conductor 342 which completes the ground circuit from both central fan 322 and oil burner motor 321 to terminal 25 of terminal block T6. Considering alignment of the panel to be in a direction of heating, a demand for heat from zone 1, for example, would cause relay R6 of FIG. 1, to operate. The input power at terminal S1 would be immediately introduced at terminal 30 on terminal block T7 via conductor 343 to solenoid valve 325 and zone fan 326; however since the ground terminals of this solenoid valve and zone fan are connected via conductor 344 to terminal 20 on terminal block T6, and since cooling relay R3 is inoperative, continuity to the ground leg across relay R3 to terminal 19 is not established, thereby preventing operation of solenoid valve and zone fan. Oil burner motor 321 has however been operating, and the fan switch illustrated by FIG. 3A and connected to terminals 7, 8 and 9 of terminal block T3 of FIG. 1, installed in the plenum immediately above the furnace, has operated to close contact 101, thereby permitting fan relay R8 to operate. This permits power at terminal S1 of terminal block T5 to be introduced at terminal 32 of terminal block T7. The power at terminal S1 is now carried by conductor 345 to the high voltage connection of damper motor 331 for zone 1, the ground side of which is connected via conductor 334 to terminal 24 on terminal block T6; and since, continuity has been established across relay R4 to terminal 23 of terminal block T6, the ground connection is completed through conductor 333 and zone damper motor will operate to open damper 346 by means of linkage 347. On a further rise of temperature, fan switch 339 will start the central fan 322 distributing heated air to zone 1. A similar call for heating for zone 2 thermostat will operate zone damper 348 by zone damper motor 322 through linkage 349. Satisfaction of all zone thermostats will result in a shut down of all equipment. If the central panel is aligned for cooling, a call for cooling from any zone will cause cooling relay R3 to operate introducing the power from terminal S1 of terminal block T5 to terminal 22 of terminal block T6 which will be carried through conductor 350 to one side of circulating pump 324, the other side of which is connected via conductor 351 to terminal 21 of terminal block T6. Simultaneously, conductor 352, which is connected to terminal block 22 through its connection to conductor 350 introduces input from phase leg L1 to compressor motor starter 353, and is in series with high and low pressure cut outs, freeze safety switches, oil pressure safety switches, overload relays, etc., to one side of the magnetic starter coil located within the starter; the other side of this magnetic coil is connected to the L2 phase leg within the starter. The starter would then operate permitting compressor motor 323 to operate. Simultaneously, the ground leg is connected through conductor 333 to terminal 19 of terminal block T6, and across the lower terminals of relay R3 to terminal 20 of terminal block T6, then through conductor 344 to the ground connection sides of zone solenoid valves and zone fans utilized for the cooling equipment. Call for cooling from zone 1, for example, would immediately introduce the input power at terminal S1 of terminal block T5 to terminal 30 of terminal block T7 through conductor 343 to the high voltage connection of solenoid valve 325, causing this solenoid valve to operate through its connection to conductor 344 to ground, as has already been established. Simultaneously, conductor 343 carries current to terminal 354 of the manual continuous-on fan switch, across this switch to conductor 355 to one side of zone 1 fan motor 326. The other side of this fan motor is connected via conductor 356 to the other pole of manual switch 329, to terminal 357 which is directly connected to conductor 344, thereby causing the zone fan motor 326 to operate. The position shown for this switch 329 is the automatic position which will cause the zone fan motor to start simultaneously with operation of solenoid valve. Moving the switch to the continuous position will cause conductor 355 to be connected to terminal 358, to conductor 359 to terminal S1 of terminal block T5, which is the high voltage or L1 phase leg. The other pole of this switch would connect conductor 356 to terminal 360 via conductor 361 to any one of the ground terminals on the main panel. For the sake of simplicity in this drawing it is shown connected via conductors 341 and 342 to the ground terminal 25 of terminal block T6; it could however have been connected to terminal 31 of terminal block T7 or terminal 28 of terminal block T7. Valve 327 and zone fan motor 328 operate for zone 2 in an identical manner to the description given immediately above for zone 1 valve and fan motor.

Manual fan switch 330 operates zone 2 fan motor 328 in a manner identical to that described for manual fan switch 329. A jumper 362 must be installed between terminal S1 and terminal S2 of terminal block T5.

FIG. 6G illustrates a similar combined system to FIG. 6F but in this case the oil burner 381 operates a water boiler which distributes heat to the various zones via circulating pump 382; and, the cooling is carried on by means of a direct expansion refrigerant air type coil through compressor 383 and starter 384, which has the air circulated by fan motor 385. The combined system again operates under the principle described for FIG. 6F by having selection of the zone operating controlled by the line voltages through terminal block T7 and by having selection of the zone equipment for heating or cooling controlled by the ground connection to terminals 20 and 24 of terminal block T6. Conductor 386 is installed as a jumper from the ground terminal of terminal block T5 to terminals 19 and 23 of terminal block T6. On a call for cooling continuity is established across to terminal 24 of terminal block T6 via conductor 387 to the ground connections of zone 1 solenoid valve 388 and zone 2 solenoid valve 389. If zone 1 thermostat calls for heat, power input from terminal S1 is introduced at terminal 30 of terminal block T7, through conductor 390 to the other side of solenoid valve 388 causing that valve to operate. Similarly, if zone 2 thermostat calls for heat, line voltage is introduced at terminal 27 of terminal block T7, through conductor 391 to the high voltage connection of solenoid valve 389 for zone 2, causing that valve to operate. Simultaneously, input power from terminal S1 is introduced at terminal 26 of terminal block T6, through conductor 392 to circulating pump 382 and across stack and limit switches 393 and 394, respectively, to oil burner motor 381. The other side of circulating pump 382 and oil burner motor 381 are connected via conductors 395 to ground terminal 25 of terminal block T6 causing the circulating pump and oil burner to operate. Oil burner motor 381 would be cycled "On" and "Off" by aquastat limit switch 394 to maintain the desired temperature of the water. If it is so desired, a two-stage high temperature and low temperature aquastat similar to aquastat 301 of FIG. 6E may be installed at the location of aquastat 394 if it is desired to use oil burner 381 in order to operate the boiler as a supply of domestic hot water, or if the mass of water content is too great for rapid heating. When the system is aligned for cooling, a call for cooling from any zone thermostat will cause relay R3 to operate effecting continuity between terminals 19 and 20 of terminal block T6, permitting the ground connection from conductor 386 to pass to conductor 396, which is connected to the ground terminals of zone 1 damper motor 397 and to zone 2 damper motor 398. It is only necessary to install a simple wire jumper between terminals 8 and 9 of terminal block T3 of panel P, instead of using a return water aquastat, in order to gain satisfactory operation of the system. As we have already seen, a call for heat from a zone thermostat will cause the zone operating thermostat to operate and line voltage is immediately conducted across the lower contacts of those relays to terminals 27 and 30 of terminal block T7. In a simple cooling system, where a heated medium is not present, the fans and zones may be permitted to start immediately without a delay for pick up. The simple wire jumper from terminal 9 to terminal 8 of terminal block T3 introduces output from terminal 41 of the transformer through conductor 63 to conductor 64, at any time that the system is aligned as a cooling panel. Thereafter operation of the zone operating relays R6 or R5 by a demand for cooling from either zone 1 or zone 2, respectively, will immediately permit the zone fan relays R8 and R7 to operate without further delay. Therefore, on a demand from zone 1 for cooling, line voltage at terminal S1 of terminal block T5 is immediately introduced at terminal 32 of terminal T7 via conductor 399 to one side of zone 1 damper motor 397; the other side of this damper motor is connected via conductor 400 and conductor 396 to terminal 20, which is already connected to the ground terminal. Damper motor 397 therefore operates opening zone 1 damper 401 through its linkage 402. Similarly a call for cooling from zone 2, introduces line voltage at terminal 29 of terminal block T7 through conductor 403 to one side of zone 2 damper motor 398, the other side of which is connected via conductor 404 and conductor 396 to terminal 20 of terminal block T6. Zone 2 damper 405 will therefore open through its linkage 406. Simultaneously line voltage at terminal S1 of terminal block T5 has been introduced at terminal 22 of terminal block T6 through conductor 407 to one side of fan motor 385, the other side of which is connected to ground terminal 21 of terminal block T6 through conductor 408. Conductor 409 also connected to terminal 22 of terminal block T6 carries line voltage at terminal S1 of terminal block T5 (L1 phase leg) to magnetic starter 384 where it passes in series with high and low pressure cut outs, oil failure safety switches, overload relays, etc., to one side of magnetic solenoid coil, the other side of which is connected to the L2 phase leg internally in the starter 384. A jumper conductor 410 must be installed between terminal S1 and terminal S2 of terminal block T5. The reason that the jumper must be installed between terminals S1 and terminal S2 of terminal block T5, at the various points specified, is that the same phase leg must be utilized for operation of the zone equipment in order to prevent a loss of control of the system. For example, if L1 phase leg were connected to terminal S1 and the L2 phase leg were connected to terminal S2 and the system were operated as a cooling system: simultaneous operation of both zones would also introduce the L1 phase leg to terminal 30 of terminal block T7 and the L2 phase leg to terminal 27 of terminal block T7; L1 phase leg would then be carried by conductor 390 to one side of solenoid valve 388, the other side of this solenoid valve would normally be connected via conductor 387 to terminal 24 of terminal block T6, and thence to ground. But since this system is aligned as a cooling system, continuity from terminal 24 to terminal 23 of terminal block T6 is not completed; therefore continuity would pass through the normally ground side of solenoid valve 389 to conductor 391 which is connected to terminal 27 of terminal block T7; and since, terminal 27 would be connected to L2 phase leg, there would be a 220 volt potential across terminals 27 and 30, causing both valves 388 and 389 to operate even though their operation was not required or called for.

FIG. 6H shows the connections which would be made for a combined system having two separate duct distribution systems, one for heating and one for cooling. Dual, parallel duct systems are used for many installations where, for example, the heat loss of a building may be very small and it would be desired to distribute the heated air to the various zones so that it is discharged from a low level at the perimeter of the buildings; and, where it may be desired to distribute the larger quantity of air required for an air conditioning system from large ceiling diffusers which may be located centrally in each of the zones. Such systems are more generally used in the commercial type of installations such as restaurants or night clubs, where the relatively smaller outside wall areas would be adequately heated by a perimeter, low wall system but where a large human load and/or lighting load would require a much larger cooling capacity; and where, for example a centrally located dance floor may require no heating capacity but where a very large cooling capacity from ceiling mounted diffusers would be desired. These connections demonstrate the hook up of a forced air furnace containing a burner 431 and including a furnace fan 432 with a zone 1 damper motor 433 for heating and a zone 2 damper motor 434 for heating. The cooling equipment consists of a direct expansion air coil operated by compressor motor 435 by starter 436, and with the circulating fan motor 437 circulating cooling air to all zones and controlling zone 1 through zone 1 damper motor 438 for cooling and zone 2 damper motor 439 for cooling. A double throw, low voltage fan switch of the type shown in FIG. 3A would be connected to terminals 7, 8 and 9 of terminal block T3 and would be installed in the plenum immediately above the hot air furnace. As in the previous two cases, a jumper conductor 440 is installed from terminal "GND" of terminal block T5 to terminals 19 and 23 of terminal block T6. When the panel is aligned for heating and any zone thermostat calls for heat, heating relay R4 causes continuity between terminals 23 and 24 of terminal block T6 permitting conductor 441 to be connected to the ground lead. Simultaneously, terminal 26 of terminal block T6 becomes connected to the terminal S1 of terminal block T5 and through conductor 442 and across limit switch and stack switch 443 and 444 to one side of burner motor 431; the other side of the burner motor is connected via conductor 445 to ground terminal 25 on terminal block T6 thereby permitting burner 431 to operate. The furnace fan motor 432 is connected via conductor 446 to high voltage leg 442 across fan switch 447 and optional plenum pressure fan motor speed control 448 to one side of the furnace fan motor, the other side of furnace fan motor 432 being connected via conductor 449 to ground terminal 25 of terminal block T6 via conductor 445. Fan switch 447 is adjusted to operate at a higher temperature than the low voltage fan switch attached to terminal block T3 of FIG. 1. On a call for heating from zone 1, and after the plenum has been slightly increased in temperature, line voltage at terminal S1 of terminal block T5 is introduced at terminal 32 of terminal block T7, and via conductor 450 to one side of zone 1 heating damper motor 433, the other side of which is connected via conductor 451 to conductor 441 to terminal 24 of terminal block T6, which has already been demonstrated as a ground connection because of relay R4 which is operating. Therefore zone 1 damper 452 will operate to an open position through its linkage 453. On a demand for heating from zone 2 thermostat, the high voltage leg of phase L1 is introduced at terminal 29 of terminal T7 and via conductor 454 to heating zone 2 damper motor 434, the other side of which is connected via conductor 455 to conductor 451 and terminal 24 of terminal block T6, of which we have already demonstrated to be connected to ground. Similarly on a call for cooling, when the panel is aligned for cooling, continuity is established from terminal 19 to terminal 20 across the lower contacts of cooling relay R3 causing conductor 456 to be connected to ground. Simultaneously, terminal 22 of terminal block T6 is connected to the S1 terminal of terminal block T5 and via conductor 457 to one side of the air conditioning fan motor 437, the other side of which is connected to ground terminal 21 of termial T6 via conductor 458. Conductor 459 is also connected to the L1 phase leg at terminal 22 of terminal block T6, and the other end is connected at magnetic starter 436 in series with high and low pressure cut outs, oil safety switches, overload relays, etc., coil, the other side of which is internally connected in the starter to the L2 phase leg. The magnetic starter would therefore pull-in, permitting the compressor motor to operate. On a call for cooling from zone 1, the line voltage at terminal S1 is connected to terminal 30 and via conductor 460 to one side of the zone 1 cooling damper motor 438 which will open zone 1 damper 461 through its linkage 462, as the other side of this damper motor is now connected to ground through terminal 20 of terminal block T6 via conductors 456 and 463. Similarly a call for cooling from zone 2 will introduce the line voltage at terminal S2 to terminal 27 of terminal block T7, via conductor 464, which will cause zone 2 cooling damper motor 439 to open zone 2 cooling damper 465 through its linkage 466. The other side of damper motor 439 is connected to conductor 456, to terminal 20 which is ground connection when cooling relay R3 is operating. Jumper 467 must be connected between terminals S1 and S2 of terminal block T5 and that connection must be made via conductor 468 to the L1 phase leg.

It is further to be noted that in all cases where an oil burner motor has been described that this burner motor may be omitted and in its place an electrically operated gas valve may be utilized where a gas fired boiler or hot air furnace is desired; in the instance where gas equipment is utilized, the proper controls are to be substituted in place of items such as stack switches which have been herein described.

Figure 7:
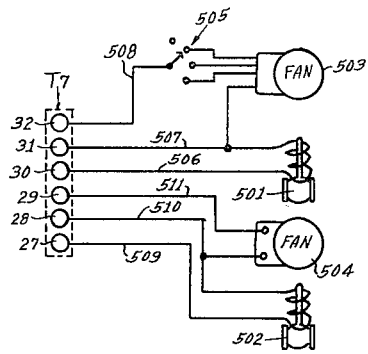
FIG. 7 is a wiring diagram of secondary or line voltage zone equipment for a circulating water system utilizing a power operated valve to control the flow of heating or cooling medium through the zone fan coil unit together with distinct control of the fan located in the fan coil unit and shows in phantom the connection of the leads to a terminal block of FIG. 1.

FIG. 7 illustrates line voltage connections for secondary, or zone equipment which is utilized by a central boiler-chiller system, or a central heat pump system. In this case circulating water, heated or cooled, is distributed to various fan-coil units for the different zones; these fan-coil units include solenoid valves 501 and 502 which control the flow of fluid and fan motors 503 and 504. Fan motor 503 is illustrated as a three-speed motor equipped with a manual three-speed switch 505. On a call for either heating or cooling from zone 1, line voltage at terminal S1 of terminal block T5 is connected to terminal 30 of terminal block T7 and via conductor 506 to one side of solenoid valve 501, the other side of which is connected via conductor 507 to ground terminal 31 of terminal block T7. As the return water aquastat illustrated by FIGS. 3 and 3A, indicate that the water temperature returning from the zones has been either heated or cooled, as required by the alignment of the control panel, fan relay R8 is permitted to operate, delivering line voltage at terminal S1 to terminal 32 of terminal block T7, and via conductor 508 and three-speed motor switch 505 to one side of zone 1 fan motor 503, the other side of which is connected to ground terminal 31 of terminal block T7 via conductor 507. Similarly, a call for heating or cooling, depending upon the alignment of the control panel, will deliver line voltage at terminal S2 of terminal block T5 to terminal 27 of terminal block T7 and via conductor 509 to one side of solenoid valve 502, the other side of which is connected via conductor 510 to ground terminal 28 of terminal block T7, thereby permitting solenoid valve 502 to open. As the return water aquastat connected to terminal block T3 of FIG. 1 indicates that the return water temperature is at the proper temperature for either heating or cooling as the alignment of the panel dictates, line voltage at terminal S2 of terminal block T5 will be connected to terminal 29 of terminal block T7 and via conductor 511 to one side of zone 2 fan motor 504, the other side of which is connected to ground terminal 28 of terminal block T7 via conductor 510.

Figure 7A:
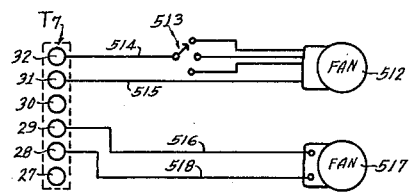
FIG. 7A is a view similar to FIG. 7 and illustrates a system wherein a zone fan coil unit controls only the operation of the fan and does not control the flow of the heating or cooling medium.

FIG. 7A illustrates the type of installation described for FIG. 7 with the exception that solenoid valves have been eliminated in order to economize and circulating heated or chilled water is permitted to circulate through the coil of the fan-coil units at any time that any zone in the system is operating. Under this system the manual fan switch connections of terminal blocks T1 and T2 will not be utilized, as a call from any other zone would cause the zone having the manual fan switch operating to deliver heating or cooling even though not desired. Connections shown in FIG. 7 would, however, permit use of the manual fan switch, as the solenoid valves would remain closed permitting the fans to operate and at the same time inhibiting the flow of the heating or cooling medium through the coils. In FIG. 7A, zone 1 fan motor 512 is shown as equipped with a three-speed motor controlled by manual fan switch 513. Upon a call for heating or cooling, when in accord with the alignment of the control panel, relay R6 of FIG. 1 will operate, but relay R8 will be inhibited until such time as the return water aquastat indicates that the water returning from the zones has been increased or reduced in temperature as required by the alignment of the control panel. When that condition has been satisfied relay R8 will close, thereby introducing line voltage from terminal S1 of terminal block T5 to terminal 32 of terminal block T7, and via conductor 514 and fan switch 513 to zone 1 fan motor 512, the other side of which is connected via conductor 515 to ground terminal 31 of terminal block T7 thereby permitting zone 1 fan motor 512 to operate. Upon a demand for operation by the thermostat of zone 2, relay R5 of FIG. 1 will operate and relay R7 will be inhibited until the return water aquastat connected at terminal block T3 has been properly satisfied, at which time line voltage at terminal S2 of terminal block T5 will be provided at terminal 29 of terminal block T7, and via conductor 516 to one side of zone 2 fan motor 517, the other side of which is connected to conductor 518 to ground terminal 28 of terminal block T7. It is to be noted here that three-speed fans and motors may be utilized on one, on all, or on any number of zone fan motors as required.

Figure 7B:
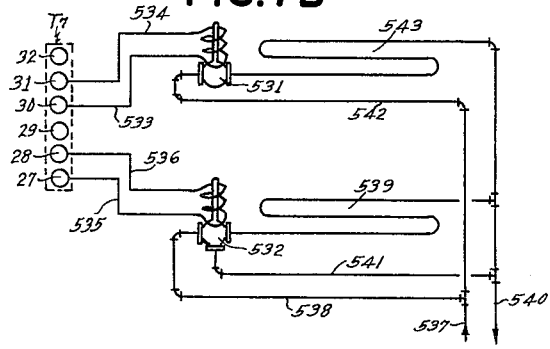
FIG. 7B is a view similar to FIG. 7 and illustrates a system wherein the flow of heating or cooling medium is controlled, by means of power operated valves, for such zones as would utilize natural convection heat convectors or cooling coils.

FIG. 7B illustrates the connection used for zones which will utilize a natural convection of heated or cooled air and for the purposes of heating may utilize baseboard radiation, warmed floor radiation heated by imbedded tubing, natural convection heat convector coils, warm panel ceiling or wall radiation heated by circulating warm tubing, etc.; or, by cooling through means of overhead natural convection chiller coils, cold panel cooling, etc. FIG. 7B illustrates a simple "On-Off" solenoid valve 531 which is operating for zone 1, and a three-way solenoid valve 532 which is operating for zone 2. Upon a call for heating or cooling, as required by alignment of the control panel, zone 1 thermostat will operate relay R6 which will introduce line voltage from terminal S1 of terminal block T5 to terminal 30 of terminal block T7 and via conductor 533 to one side of solenoid valve 531, the other side of which is connected via conductor 534 to ground terminal 31 of terminal block T7, causing this valve to open. Upon a call for operation from the zone 2 thermostat, relay R5 would operate introducing line voltage from terminal S2 of terminal T5 to terminal 27 on terminal block T7 and via conductor 535 to one side of three-way solenoid valve 532, the other side of which is connected to ground terminal 28 of terminal block T7 via conductor 536. When valve 532 operates, the flow of the heating or cooling medium is from the main supply line 537 through branch 538 to the inlet of water valve 532 and through the heating or cooling coil 539 to the return main 540. When valve 532 is deenergized, the flow of water is diverted to a return line 541 to the return main 540, so that the water does not flow through the coil 539. Valve 531 is a simple "On-Off" valve which in the energized position permits water to flow through the branch 542 and through valve 531 through cooling or heating coil 543, then returning to the return main 540. Among the main benefits of using a three-way valve such as valve 532 is that the flow of water through the system remains balanced even though all zones are not operating, and gives the added advantage of having the cold or heated supply of water immediately before the cooling or heating coil so that a period of time does not elapse upon energization of the valve while the heating or cooling medium travels through the branch to the valve. Three-way valves and their connection as described herein may be substituted for the simple solenoid valve as described and illustrated under FIG. 7 if desired.

Figure 7C:
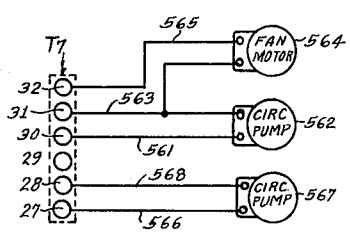
FIG. 7C is a view similar to FIG. 7 and illustrates a system utilizing circulating pumps in lieu of the valves illustrated in FIG. 7B, a fan motor being also shown as utilized for one of the zones.

FIG. 7C illustrates a type of installation which might be used where a system is considerably larger than those previously described, and where individual circulating pumps would be desired for each of the various zones. In this type of installation the circulating pumps as illustrated by FIGS. 6 through 6G would be omitted. Upon a call for heating or cooling from the zone 1 thermostat in accord with the alignment of the control panel, input voltage at terminal S1 of terminal block T5 would be introduced to terminal 30 of terminal block T7 and via conductor 561 to one side of circulating pump 562, the other side of which is connected via conductor 563 to ground terminal 31 of terminal block T7, thereby permitting circulating pump 562 to operate. A fan motor 564 is illustrated as being controlled through the return water aquastat, previously illustrated, as connected at terminal block T3 of FIG. 1, and which upon proper increase or decrease of return water temperature in accord with the alignment of the panel, would introduce the line voltage at terminal S1 of terminal block T5 to terminal 32 of terminal block T7 and via conductor 565 to one side of fan motor 564, the other side of which is connected to ground terminal 31 of terminal block T7 through conductor 563. Upon a call for operation from zone 2 thermostat, line voltage at terminal S2 of terminal block T5 is introduced to terminal 27 of terminal block T7 and via conductor 566 to one side of circulating pump 567, the other side of which is connected to ground terminal 28 of terminal block T7 via conductor 568, thereby permitting circulating pump 568 to operate. In the event that the circulating pumps are of a size too large to be operated directly by the contacts within the control panel, it is to be understood that a magnetic relay or motor starter would be utilized and would be connected to the terminals shown here as directly operating the circulating pumps.

It is to be understood that the previously described eight methods and types of secondary equipment hook-ups may be utilized in one system and may be intermixed at will with no fear of any possibility of loss of control through cross connections.

Figure 7D:
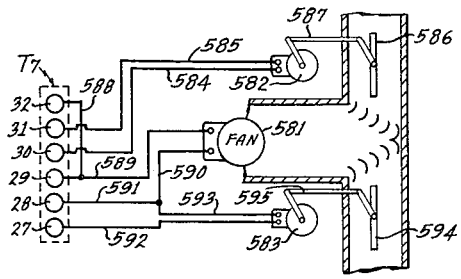
FIG. 7D is a view similar to FIG. 7 and illustrates a heating and/or cooling system utilizing simple duct work for the distribution of heated or cooled air, as in FIG. 6C, or in arrangements where a forced air system heat-pump may be used.

FIG. 7D shows the connections to be utilized for a forced air heating and cooling system utilizing a common duct distribution. These connections to the secondary equipment terminals of terminal block T7 will be used for heating and cooling applications utilizing primary equipment consisting of hot air furnaces and direct expansion cooling coils or by water-to-air or air-to-air heat-pump installations or systems where a source of city piped steam and centrally chilled circulating water may be available, etc. This system would consist of a common fan motor 581, a zone 1 damper motor 582 and a zone 2 damper motor 583. Upon a call for operation by zone 1 thermostat, line voltage at terminal S1 of terminal block T5 is introduced to terminal 30 of terminal block T7 and via conductor 584 to one side of zone 1 damper motor 582, the other side of which is connected via conductor 585 to ground terminal 31 of terminal block T7, thereby permitting zone 1 damper 586 to open through its linkage 587. When the cooling or heating medium has become compatible to the alignment of the control panel, the line voltage at terminal S1 of terminal block T5 will be introduced to terminal 32 of terminal block T7 and via jumper conductor 588 to conductor 589, to one side of fan motor 581, the other side of which is connected via conductors 590 and 591 to ground terminal 28 of terminal block T7, thereby permitting circulating fan 581 to operate. Upon demand for operation from zone 2 thermostat, line voltage at terminal S2 of terminal block T5 is introduced at terminal 27 of terminal block T7 and via conductor 592 is connected to one side of zone 2 damper motor 583, the other side of which is connected via conductor 593 and conductor 591 to ground terminal 28 of terminal block T7, thereby permitting damper 594 to open through its linkage 595. Again, as the temperature sensing device connected to terminals 7, 8 and 9 of terminal block T3 of FIG. 1 becomes satisfied in accord with the alignment of the control panel, line voltage at terminal S2 of terminal block T5 is introduced at terminal 29 of terminal block T7 and via conductor 589 to one side of fan motor 581, the other side of which is connected via conductors 590 and 591 to ground terminal 28 of terminal block T7, thereby permitting circulating fan 581 to operate. It is again to be noted that the use of jumper 588 makes it essential that control panel be utilized for 115 volt operation only and that a simple wire jumper be placed between terminals of terminal block T5; and that terminals S1 and S2 be connected only to the L1 phase leg of the power system while the "GND" terminal of terminal block T5 is connected to the ground leg of the power system.

Figure 8:
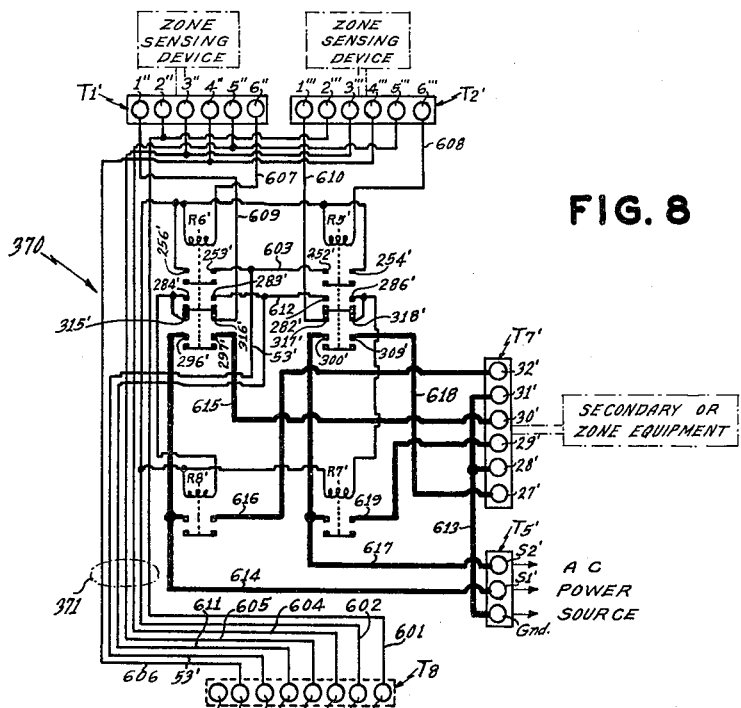
FIG. 8 is a view similar to FIG. 1 and illustrates an auxiliary control panel utilized to extend control of the system to more than the two zones served by the main panel illustrated in FIG. 1.

FIG. 8 illustrates the internal wiring of an auxiliary control panel 370 which is utilized to extend the functions of the main control panel P, illustrated in FIG. 1, to operate two additional zones. It also shows connections to terminal block T8 of FIG. 1, shown in phantom view. This panel incorporates a line voltage input terminal block T5' having three terminals, marked "GND," S1' and S2'. Terminal block T7' is utilized for the line voltage connections of two additional zones, and has six terminals 27' through 32'; these terminals serve the identical purposes for these two additional zones that terminals 27 through 32 of terminal block T7 of FIG. 1 serve for the two zones wired internally in the main panel of FIG. 1. Terminal block T1' and T2' each contain six terminals 1" through 6" and 1'" through 6'", respectively, and are used for thermostat connections from the two additional zones.

The panel 370 contains four relays which are identical in function and connections to relays R5, R6, and R7 and R8 as shown by FIG. 1, with the exception that they serve the two additional zones, however, still integrating the functions of the main panel relays in controlling the overall operation of the system. Relay R5' is the operating relay for the zone served by the thermostat connected to terminal block T2', relay R6' is the operating relay for the zone having its thermostat connected to terminal block T1'. Fan relay R7' serves the same zone as relay R5', and fan relay R8' serves the same zone as relay R6'.

To fully utilize the operation of the system through this extension panel, a 7-conductor, low-voltage cable 371 is connected to terminals 33 through 39 of terminal block T8 of FIG. 1. Output from the transformer TR terminal 41 of FIG. 1 is introduced into panel 371 via conductor 601 to terminals 2" and 2'" of blocks T1' and T2', respectively. Terminals 2" and 2'" serve the manual fan function through the zone thermostat in the same manner as previously described for terminals 1 and 2 of terminal block T1 of FIG. 1. Output from terminal 42 of the transformer, being introduced through conductor 602, is carried to one side of the coils of relays R5' through R8', in the same manner that it is conducted to relays R5 through R8 of FIG. 1. Output from transformer terminal 42 is also connected to the top-most contacts 254' and 256' of operating relays R5' and R6', respectively, in the manner identical to the connections illustrated for relays R5 and R6 of FIG. 1, via conductor 603 and conductor 53' to terminal 38 of terminal block T8 of FIG. 1 and, referring back to FIG. 1, the circuit is traced from terminal 38 of terminal block T8, via conductor 53, which is connected to conductor 52 connected in an identical manner with relays R5 and R6, conductor 53 continuing onto its connections with one side of relays R3 and R4 of FIG. 1. Therefore, it is seen that the uppermost contacts of R5' and R6' serve the identical function as in relays R5 and R6 of FIG. 1.

As previously described for the main control panel P, operation of the heating alignment relay R2 causes output from terminal 41 of the transformer to be carried into conductor 47 and thence to terminals 5 and 5' of terminal T1 and T2, respectively, and conductor 47 continues to its termination at terminal 35 of terminal block T8. The circuit is traced in FIG. 8 from terminal 35 of terminal block T8, via conductor 604 to the terminals 5" and 5'" of terminal blocks T1' and T2', respectively, to provide identical functions for the fifth terminal on terminal blocks T1, T2, T1' and T2'. When the cooling alignment relay R1 of the main panel P is operating, output from transformer terminal 41 is conducted across the upper terminals 273—274 of relay R1 and via conductor 48 to terminals 3 and 3' of terminal blocks T1 and T2, respectively, continuing to terminal 36 of terminal block T8, and the circuit continues in FIG. 8 via conductor 605 to terminals 3" and 3'" of terminal blocks T1' and T2', respectively, again illustrating identical functions of the same numbered terminals as in the main panel.

The prior description of FIG. 5 has shown that, during cooling alignment of the panel, the timer introduces output from terminal 41 of the transformer to terminal 39 of terminal block T8, and tracing the circuit in FIG. 8, via conductor 606, it terminates at the fourth terminal of terminal blocks T1' and T2', in the same manner that conductor 54 of FIG. 1 terminates at the fourth terminal of terminal blocks T1 and T2, again illustrating identical functions of all fourth terminals of the thermostat terminal blocks. Terminal 6" of terminal block T1' is connected via conductor 607 to one side of relay R6', and terminal 6'" of terminal block of T2' is connected via conductor 608 to one side of relay R5' in a manner identical to which terminal 6 of terminal block T1 and terminal 6' of terminal block T2 are connected to relays R6 and R5, respectively, of FIG. 1. Terminal 1" of terminal block T1' is connected via conductor 609 to the normally closed middle contacts 316'—315' of relay R6' and terminal 1'" of terminal block T2' is connected via conductor 610 to the normally closed middle contacts 317'—318' of relay R5' in the identical manner in which terminal 1 and terminal 1' of terminal blocks T1 and T2 are connected to relays R6 and R5 of FIG. 1, respectively. Consequently there is identical connection and function for all six terminals on each thermostat terminal block. Terminal 37 of terminal block T8 is connected via conductors 611 and 612 to the normally open middle contacts 283' and 282' of relays R6' and R5', respectively, in a manner identical to the connections of conductors 64 and 51 of FIG. 1, which terminates at terminal 37 of terminal block T8. Referring again to FIG. 1, it is noted that conductor 51 joins conductor 63 which terminates at terminal 8 of terminal block T3 in order to serve the automatic fan functions, as described for FIGS. 3 and 3A.

The ground connection of terminal block T5' is connected via jumper 613 to terminals 28' and 31' of terminal block T7'. Terminal S1' of terminal block T5 is carried via conductor 614 to relays R6' and R8' and via conductors 615 to terminal 30' of terminal block T7' and conductor 616 to terminal 32' of terminal block T7' in the identical manner that terminal S1 of terminal block T5 serves terminals 30 and 32 of terminal block T7 of FIG. 1. Terminal S2' of terminal block T5' is carried via conductor 617 to the contact of relay R7' and the lower contact 300' of relay R5', and via conductor 618 and 619 to terminals 27' and 29' of terminal block T7', in the identical manner that terminal S2 of terminal block T5 serves terminals 27 and 29 of terminal block T7 of FIG. 1.

Connections of secondary or zone equipment for these two additional zones would be made to terminal block T7' of FIG. 8 in a manner identical to that described for connections to terminal block T7 of FIG. 1; and, it is not necessary that the same type of secondary equipment be utilized for these two zones but the selection may be intermixed from any of those described under FIGS. 7 through 7C, or additional ones as trade practices may require.

Figure 8A:
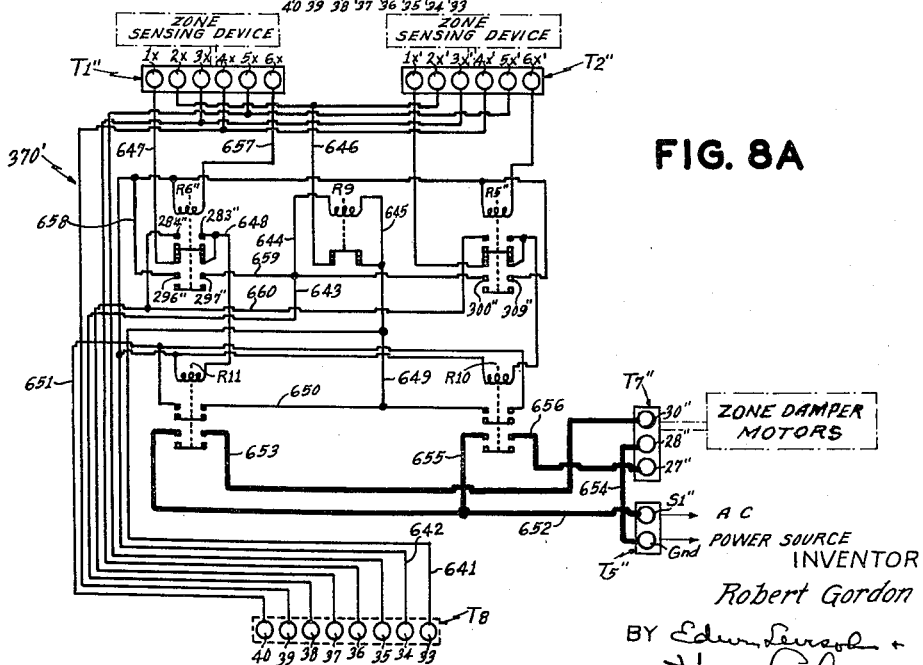
FIG. 8A illustrates a modification of the auxiliary panel illustrated in FIG. 8, for utilization where the extended zones are to be operated from a central heating and cooling plant distributing air through duct work, as illustrated in FIG. 6C.

FIG. 8A is an extension panel 370' utilized when the additional zones are to be heated and cooled by the single duct system illustrated under FIG. 6C. Terminals 33 through 39 of terminal T8 are utilized and connected to thermostat terminal blocks T1″ and T2″ in a manner identical to that previously described for FIG. 8. However, terminal 40 of terminal block T8 is utilized by this extension panel for the purpose of operating the central fan motor as described under FIG. 6C, this being accomplished through the connection of terminal 40 of terminal block T8, referring to FIG. 1, via conductor 56 to its junction with conductor 55, which is in turn connected to terminal 1 of terminal block T1. This permits a demand for fan operation to connect output from terminal 41 of transformer TR to one side of fan relay R8 of FIG. 1 via the normally closed middle contacts 315—316 of relay R6. Therefore, when the zone served by operating relay R6 is inoperative, the zone fan relay R8 may be operated through demand from zones served by terminal blocks T1″ and T2″ of FIG. 8A; and, this demand may be made, as will be illustrated, for either continuous fan operation or the heating function with the exception that operation of relays R5 and R6 will inhibit the continuous fan function of zones served by terminal blocks T1′ and T2′ of FIG. 8A as well as closing the zone dampers which may have been opened under a demand for continuous fan operation. The extension panel shown by FIG. 8A contains operating relays R6″ and R5″ which serve the temperature function of the zone thermostat connected to terminal blocks T1″ and T2″, respectively, via their connections to terminals 6X and 6X′, respectively. The lower contacts 296″—297″ and 300″—309″ of these relays is connected via conductor 642 and terminal 34 of terminal block T8 to terminal 42 of the transformer TR in a manner identical to that described for the uppermost contacts of relays R5 and R6 of FIG. 1, and operation of relay R5″ or R6″ will carry current via conductor 643 to terminal 38 of terminal block T8 in a manner identical to the connections of the uppermost terminals of relays R5 and R6 of FIG. 1, via conductors 52 and 53 to terminal 38 of terminal block T8. However, via a junction and connection to conductor 644, a connection is made to one side of the coil of manual fan inhibiting relay R9 which has a single normally closed contact. The other side of the coil of relay R9 is connected via conductor 645 and conductor 641 to terminal 33 of terminal block T8, thereby causing relay R9 to become energized whenever one or more of operating relays R5, R6, R5″ or R6″ are demanding temperature change through an unsatisfied thermostat condition. When none of these operating relays are energized, relay R9 remains deenergized, thereby introducing output from terminal 41 of the transformer TR via terminal 33 of terminal block T8, via conductor 641 and conductor 645 across the normally closed contacts of relay R9, via conductor 646 to terminals 2X and 2X′ of terminal blocks T1′ and T2′, respectively. Using as an example the thermostat connected to terminal block T1″, closing the continuous fan switch will permit a continuation of the current from terminal 2X to terminal 1X of terminal block T1″, via conductor 647 to the normally closed contact of the upper contacts of operating relay R6″. This relay, being deenergized, permits current to pass to conductor 648 to one side of the coil of zone fan-damper relay R11; the other side of this coil is connected via conductor 642 to terminal 34 of terminal block T8 and thence to terminal 42 of transformer TR, thereby causing relay R11 to operate. Output from terminal 41 of the transformer TR, having been introduced at terminal 33 of terminal block T8, is conducted via conductor 641, conductor 649 and conductor 650 to the upper contact of relay R11, which being energized permits current to flow through conductor 651 to terminal 40 of terminal block T8.

Referring again to FIG. 1, it is noted that terminal 40 of terminal block T8 is connected via conductor 56 to a juncture with conductor 55 which is connected to terminal 1 of terminal block T1; and this arrangement operates fan relay R8 in an identical manner as if manual fan switch had been connected between terminals 1 and 2 of terminal block T1. The exception to this point is that the thermostats connected on the central control panel shown by FIG. 1, when the panel is used for primary equipment illustrated by FIG. 6C, may not have thermostats connected to terminal blocks T1 and T2 equipped with manual continuous fan switches, as operation of these switches would not control the zone dampers connected to terminals 27 and 30 of terminal block T7 of FIG. 1. However, in the case of the extension panel illustrated by FIG. 8, the lower contacts of relays R10 and R11 directly operate the zone damper motors for the zones served by thermostats connected to terminal blocks T2′ and T1′, respectively. In this case, the phase leg of the line voltage will be connected via conductor 652 and across the lower contacts of relay R11 to conductor 653 to terminal 30″ of terminal block T7″; and, a damper motor connected to this terminal and to terminal 28″ of terminal block T7″ will, therefore, operate as terminal 28″ of terminal block T7″ is connected via conductor 654 to the ground input terminal of terminal block T5″. The operation of the second zone served by this extension panel is identical to that just described through connections of terminal block T2′ to relays R5″ and R10, with the exception that line voltage from terminal S1″ of terminal block T5″ is now introduced through conductor 652 and conductor 655 across the lower contacts of relay R10 via conductor 656 to terminal 27″ of terminal block T7″, thereby permitting a damper motor connected between terminal 27″ and terminal 28″ to operate.

There is now described the thermostatic control by a heating and cooling thermostat, such as illustrated by FIG. 4, when connected to terminal block T1″ of FIG. 8A. As previously noted, terminal 5X will carry output from terminal 41 of transformer TR at such time that the heating alignment relay R2 is operating, and that terminals 3X and 4X will not be energized. When the panel P, through operation of alignment relay R1, is aligned as a cooling panel, terminal 3X is connected to the output of terminal 41 of transformer TR, and 5X becomes disconnected; and upon operation of the dehumidification timer, terminal 4X also becomes energized with output from terminal 41. Therefore, at any time the panel P is aligned for a certain condition, and when the thermostatic control attached to terminal block T1″ is in an unsatisfied condition for the alignment of the panel, output from terminal 41 of transformer TR becomes connected to terminal 6X of terminal block T1″, and via conductor 657 to one side of the coil of relay R6″, the other side of which is connected via conductor 642, terminal 34 of terminal block T8 and conductor 46 of FIG. 1 to terminal 42 of transformer TR, thereby causing relay R6″ of FIG. 8A to become energized. Output from terminal 42 of transformer is carried from conductor 642 and conductor 658 to the lower contacts of operating relay R6″ to conductor 659 to the junction of conductors 643 and 644, causing manual control fan inhibiting relay R9 to become energized and introducing output from terminal 42 of transformer to terminal 38 of terminal block T8, via conductor 53 of FIG. 1 to one side of the coils of main heating and cooling relays R4 and R3 in a like manner to the operation of operating relays R6 and R5. Simultaneously, the upper normally open contacts 283″—284″ of relay R6″ have closed, connecting terminal 37 of terminal block T8 via conductor 660 to conductor 648, to one side of the zone fan-damper relay R11. Consequently, the lower contacts of operating relay R6″ have permitted the heating or cooling relays R4 or R3 to operate, as required by the alignment relays R2 or R1, respectively, starting the heating or cooling equipment as required by the alignment of the central control panel. However, terminal 37 of terminal block T8 does not become energized with output from terminal 41 of transformer TR until such time as the medium sensing device connected to terminals 7, 8 and 9 of terminal block T3 has indicated that the air temperature in the duct plenum is at a condition satisfactory to the alignment of the control panel system. At that time output from terminal 41 of transformer TR is introduced to terminal 8 of terminal block T3 on the FIG. 1 and via conductor 63 and 51 to terminal 37 of terminal block T8. As the temperature of the plenum becomes heated or cooled, as required by the alignment of the system, output from terminal 41 of the transformer TR is introduced to terminal 37 of terminal block T8 and, referring again to FIG. 8A, via conductor 660, and across the upper normally open contacts of operating relay R6″ and conductor 648, and fan-damper relay R11 becomes energized opening the damper via the motor connected across terminals 30″ and 28″ of terminal block T7″; and simultaneously operating the fan relay R8 of FIG. 1, thereby causing the central furnace fan to operate. Identical operation to that just described is also afforded for the zone served by a thermostat connected to terminal block T2″.

Figure 9:
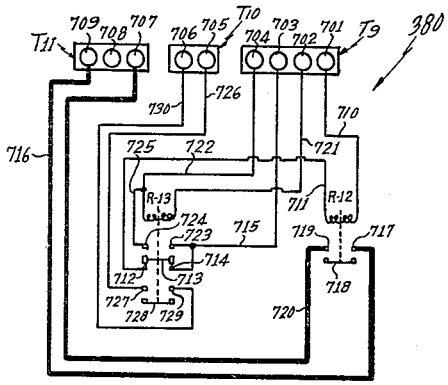
FIG. 9 is a view similar to FIG. 8 and illustrates an auxiliary panel for the automatic control of an attic exhaust fan and includes a fire alarm circuit.

FIG. 9 illustrates the internal wiring of an auxiliary control panel 380, which is utilized for the automatic control of an attic exhaust fan and which includes a fire alarm circuit, to prevent the attic exhaust fan from operating in the event of a fire. There are three terminal blocks provided, T9, T10 and T11. Terminal block T9 includes four terminals 701, 702, 703 and 104, which are utilized for the connections to terminal block T8 of the main control panel illustrated in FIG. 1. Connections to terminal block T9 are low voltage input terminals and include the connections from the various sensing devices. Terminal block T10 contains two terminals 705 and 706 and are utilized for the control of the fire alarm bell. This bell may be line voltage, 24 volt A.C. low voltage, or direct current battery operated, as may be desired by the user. Terminal block T11 contains three terminals 707, 708 and 709 and is utilized for line voltage connections and control of the attic exhaust fan. The panel contains two relays, an attic fan relay R12 and the fire alarm relay R13. The relay R13 is a sealed relay, commercially available, for the purpose of positive operation at high reliability in the event of energization and would be installed on the panel by means of a quick connect plug, such as a standard radio tube octal plug. This feature permits use of a relay designed for 24 volt A.C. current, or direct current of a voltage required by the battery, if a battery system is desired. Internal circuitry will be explained more fully in connection with the following description of the operation of the panel.

Figure 9A:
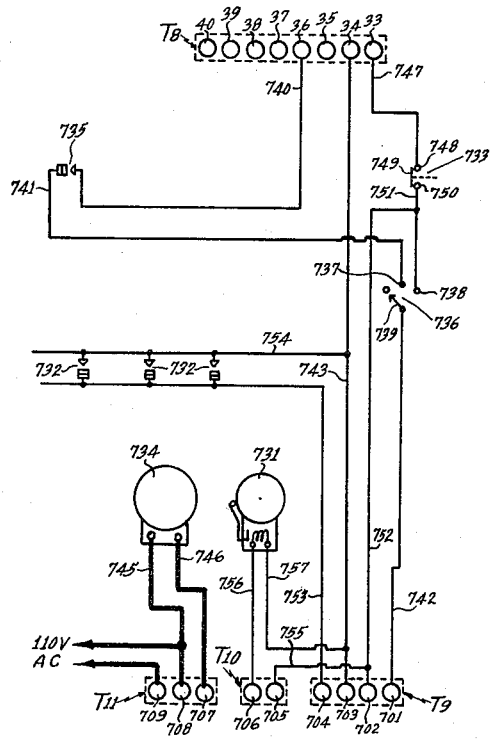
FIG. 9A illustrates an attic exhaust fan-fire alarm system interconnected between the auxiliary panel of FIG. 9 and the main control panel of FIG. 1, utilizing low voltage power for both the fan and fire alarm circuits.

FIG. 9A illustrates the connections between terminal block T8, shown in phantom view, of the main control panel illustrated by FIG. 1, and the fan-fire alarm panel illustrated by FIG. 9. The fire alarm bell 731 is in this case operated by the 24 volt A.C. voltage supplied by the main control panel illustrated by FIG. 1 and shows fire detection devices 732, and may have as many of these devices as described, connected in parallel. These devices are of a commercially available type, and are of the normally open type which close contact upon detection of the existence of a temperature sufficiently high to indicate the presence of fire. A normally closed, manual reset button 733 is used to stop the alarm and reset the panel after a fire has occurred. The attic exhaust fan 734 is controlled through the operation of an attic thermostat 735 and by means of the manual selector switch 736. This switch has three positions and is illustrated in the "Off" position, an automatic position is at terminal 737 and a continuous "On" position is at terminal 738. A movable arm 739 is used to select "Off," automatic or "On" operation of the attic fan. Referring now to FIG. 1, it is noted that terminal 33 of terminal block T8 is at all times connected with terminal 41 of transformer TR, and that terminals 34 of terminal block T8 is at all times connected with terminal 42 of transformer TR. As previously indicated, any time that the panel is aligned as a cooling panel, output from terminal 41 of transformer TR is also available at terminal 36 of terminal block T8. This provides for automatic control of the attic exhaust fan so that it will operate at such time as the system is aligned as a cooling system.

With the manual control switch 736 set at the automatic position, so that movable contact 739 is engaged with the fixed contact 737, output from transformer TR terminal 41 is introduced at terminal 36 of terminal block T8, at such time when the panel is aligned as a cooling panel, and via conductor 740 is connected to one side of the attic thermostat 735. When this thermostat, placed within the attic space, indicates that the temperature is such that fan operation would be desirable, continuity is effected across the contacts of the thermostat to conductor 741, to stationary contact 737 of the manual fan switch 736, across the movable contact 739, and via conductor 742 to terminal 701 of terminal block T9. The circuit can be traced in FIG. 9 from terminal 701 via conductor 710 to one side of the coil of relay R12; the other side of the coil of relay R12 is connected via conductor 711 to stationary contact 712, across movable contact 713, which is in a normally closed position, to fixed contact 714, via conductor 715 to terminal 703 of terminal block T9. Referring to FIG. 9A, the circuit continues from terminal 703 of terminal block T9, via conductor 743 to terminal 34 of terminal block T8, which is being permanently connected to receive output from terminal 42 of transformer TR of FIG. 1. Under these conditions relay R12 has become energized and continuity is established from terminal 709 of terminal block T11 of FIG. 9 via conductor 716 to fixed contact 717, across movable contact 718 to fixed contact 719, via conductor 720 to terminal 707 of terminal block T11. Referring again to FIG. 9A, it is noted that one side of the 110 volt A.C. current is connected to terminal 709 of terminal block T11 and that the other side is connected to terminal 708 of terminal block T11, and that the side connected to 708 is directly connected via conductor 745 to one side of the attic exhaust fan 734, and that the other side of the attic exhaust fan 734 is connected via conductors 746 to terminal 707 of terminal block T11. As described, when attic fan relay R12 of FIG. 9 is energized continuity is established from terminal 709 to terminal 707 of terminal block T11, this action permitting attic exhaust fan to 734 operate.

When manual selector switch 736 is set in the continuous "On" position, output from terminal 41 of transformer TR of FIG. 1 is introduced via terminal 33 of terminal block T8, via conductor 747 to fixed contact 748 of normally closed reset switch 733, across movable contact 749, via fixed contact 750 and conductor 751 to fixed terminal 738 of selector switch 736, via movable contact 739, and conductor 742 to terminal 701 of terminal block T9. Operation from here on is identical to that just described under automatic operation with the exception that attic fan motor 734 will continue to operate until manual fan switch is placed in a different position or unless fire alarm relay R13 of FIG. 9 operates. In illustration of the operation of the fire alarm circuit, it is noted that output from terminal 41 of transformer TR is introduced at terminal 33 of terminal block 38, via conductor 747, fixed contact 748 of reset switch 733, via movable contact 749 to fixed contact 750, via conductor 751 and conductor 752 to terminal 702 of terminal block T9. Referring again to FIG. 9, and tracing the circuit from terminal 702 of terminal block T9 via conductor 721 to one side of coil of fire alarm relay R13, the other side of this coil is connected via conductor 722 to terminal 704 of terminal block T9; and, referring again to FIG. 9A, the circuit continues from terminal 704 of terminal block T9, via conductor 753 to one of the contacts of fire detection devices 732, any number of which may be installed in parallel, and in the event that ambient temperature is such that presence of fire is indicated, continuity will be established to conductor 754 and via conductor 743 to terminal 34 of terminal block T8. As indicated, terminal 34 of terminal block T8 of FIG. 1 is permanently connected to the output available at terminal 42 of transformer TR, consequently fire alarm relay R13 of FIG. 9 has been energized. Output from terminal 42 of transformer TR is also carried via conductor 743 to terminal 703 of terminal block T9, and the circuit continues in FIG. 9 via conductor 715 to fixed contact 723 of relay R13 across movable contact 713, which is now in an energized position, to fixed contact 724 via jumper conductor 725 and conductor 722 to the same side of the coil of relay R13 that carried polarity of terminal 42 of transformer TR upon activation of the fire detecting devices 732 of FIG. 9A. This feature permits the fire alarm relay R13 to remain energized, even though the particular fire detection device which may have caused the operation of the relay, has become cooled. This might occur where a fire detection device is placed in the direct air stream resulting from operation of the attic fan 734 and which may now not direct the heated air across the detection device due to inhibition of the fan relay R12. This inhibition is caused by opening of the normally closed contacts through energization of the fire alarm R13, interrupting the continuity from conductor 715, across stationary contact 714, movable contact 713, stationary contact 712 and conductor 711 to one side of the coil of fan relay R12. Fire alarm relay R13 will remain in an energized position, until such time as manual reset switch 733 of FIG. 9A is depressed, interrupting the current flowing from terminal 33, from polarity of terminal 41 of transformer TR of FIG. 1 via terminal block T8. Momentarily depressing the normally closed contact of manual reset switch 733 opens continuity from stationary contacts 748 and 750 through the movable contact 749 causing conductors 751 and 752 to become non-conductive. This interrupts the continuity from terminal 702 of terminal block T9 of FIG. 9 via conductor 721 to the one side of the coil of fire alarm relay R13, which is directly connected to the source of power across the manual reset button. The relay R13 therefore becomes de-energized allowing the movable contact 713 to resume its normally closed position. Simultaneously with the operation of movable contact 713 upon energization of fire alarm relay R13, continuity is established from terminal 705 of terminal block T10 via conductor 726 to stationary contact 727 across movable contact 728 and stationary contact 729 and conductor 730 to terminal 706 of terminal block T10. Referring now to FIG. 9A, it is noted that a jumper conductor 755 carries the output from terminal 41 of transformer TR to terminal 705 of terminal block T10. As indicated, operation of the fire alarm relay R13 has caused continuity between terminals 705 and 706 of terminal block T10 and therefore continuity is established from conductor 755 and via conductor 756 to one side of the operating magnet of fire alarm bell 731, the other side of which is connected via conductor 757 to a connection with conductor 743 which is connected to terminal 34 of terminal block T8, and which has already been demonstrated as being permanently connected to receive output from terminal 42 of transformer TR of FIG. 1. Therefore operation of fire alarm relay R13 will cause the alarm bell 731 to ring until such time as the fire detection devices 732 indicate that there is no fire present and until such time as the manual reset button 733 has been momentarily depressed. It may be noted that in the event it is desired to use a line voltage fire alarm bell, instead of the low voltage bell, the only changes necessary are that conductor 757 will be attached to terminal 708 of terminal block T11, and the jumper conductor 755 will be connected from terminal 705 of terminal block T10, to terminal 709 of terminal block T11, instead of its illustrated connection to terminal 702 of terminal block T9.

Figure 9B:
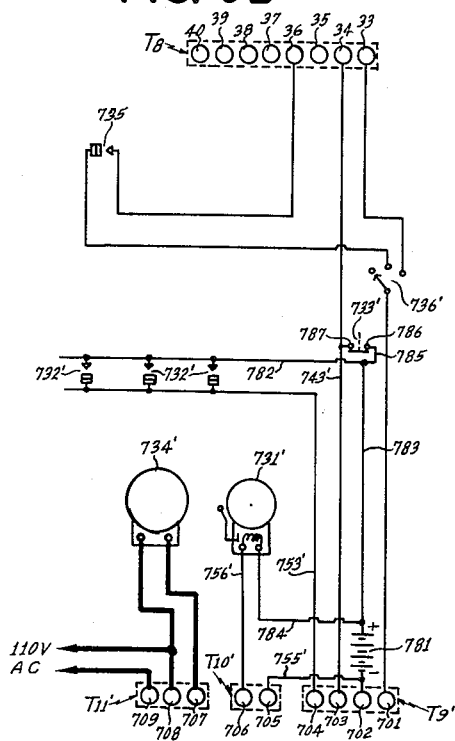
FIG. 9B illustrates a modification of the fan-firm alarm circuit of FIG. 9A in which the alarm circuit and sensing devices are operated by a battery system.

FIG. 9B illustrates connections similar to those previously discussed under FIG. 9A with the exception that a battery 781 is utilized as the power supply for operation of the fire alarm relay R13 and for the operation of the fire alarm bell 731'. The manual reset switch 733' and the fire detection devices 732' are identical to the usage described under FIG. 9A but are now connected in the battery circuit. The attic thermostat 735' and the manual fan selector switch 736' are connected in a manner identical to that described under FIG. 9A. The attic exhaust fan motor 734' is connected to the line voltage in a manner identical to that described under FIG. 9A. The conductor 752 shown under FIG. 9A is not used in FIG. 9B as its purpose is the introduction of 24 volt A.C. for operation of the fire alarm relay.

In the operation of the fire alarm using the battery system, the negative pole of battery 781 is connected to terminal 702 of terminal block T9 and is also connected via jumper 755' to terminal 705 of terminal block T10. The circuit in FIG. 9 continues from terminal 702 of terminal block T9 by a conductor 721 to one side of the coil of fire alarm relay R13; this relay now being used will have its coil rated at a voltage equal to the direct current voltage of the battery 781. The other side of the coil of relay R13 is connected by a conductor 722 to terminal 704 of terminal block T9, and referring to FIG. 9B, the circuit is traced via conductor 753' to one side of the fire detection devices 732' which may be of any number connected in parallel, and upon the detection of presence of fire, continuity is established to conductor 782 and via conductor 783 to the other pole of battery 781; thereby energizing the coil of fire alarm relay R13 causing it to operate. Energization of the fire alarm relay permits continuity from the negative pole of battery 781 via conductor 755', from terminal 705 to terminal 706 of terminal block T10, by a conductor 756' to one side of the fire alarm bell 731', via conductor 784 to the positive side of battery 781, thereby causing fire alarm bell 731' to ring. The fire alarm relay R13 is maintained in an energized position by use of the same jumper 725 shown in FIG. 9 from conductor 722 to the stationary contact 724, across movable contact 713 to stationary contact 723 via conductor 715 to terminal 703 of terminal block T9, in the following manner. After initial energization of the fire alarm relay R13 by operation of any one of the fire detection devices 732', continuity from the positive pole of battery 781 is carried via conductor 783 across jumper conductor 785 to stationary contact 786 of normally closed reset switch 733' to the other stationary contact 787 via conductor 743' to terminal 703 of terminal block T9. The circuit continues in FIG. 9 from terminal 703 of terminal block T9 by a conductor 715 to stationary contact 723 across movable contact 713 to stationary contact 724 and via conductor 725 to one side of the coil of relay R13. The other side of this coil is connected via conductor 721 to terminal 702 of terminal block T9, and thence to the negative pole of battery 781 thereby maintaining energization of the fire alarm relay R13. On cooling of the fire detection element 732, momentarily depressing of the manual reset switch 733' will break the continuity through the coil of relay R13 permitting it to return to its normal position.

While the heating and cooling alignment relays R1 and R2 have been illustrated and described herein as double pole single throw units, it will be understood that it is within the scope of the present invention to replace them with a triple pole double throw relay, which would have the coil thereof connected in a manner identical with the connections shown in FIG. 1 for relay R1; and which would have the normally open contacts 273—274 and 270—271 connected in a manner identical to the connections shown for relay R1. Conductors 47 and 49 shown connected to the stationary contacts of relay R2 would now be connected to the stationary normally closed contacts of said triple pole single throw relay unit. This arrangement has the panel normally aligned as a heating panel, but converts it to cooling alignment upon energization of said triple pole single throw relay unit. The third pole of said triple pole double throw relay is utilized for the purpose of preventing a cross-control situation and is interconnected with the other two poles as follows: the armatures of each of the three poles are interconnected by means of a jumper. Input from terminal 14 via conductor 60 is now introduced via the normally closed contact of the third pole so that when the selector switch is thrown to "Heat," output from terminal 41 of the transformer is introduced to conductors 47 and 49 via the other two normally closed contacts of said triple pole double throw relay. When the selector switch is thrown on "Cool," the coil of said relay is energized in a manner similar to the coil of relay R1; and output from terminal 41 of the transformer is introduced directly via a connection from conductor 61 to the normally open contact of the aforementioned third pole of said relay, this output being then connected via the other two normally open contacts to conductors 48 and 50 as in the case of relay R1.

As used in the claims herein, it will be understood that the terminology "primary heating equipment" includes, without limitation, apparatus to control the introduction of a heated fluid from a remote source, for example purchased steam, into the temperature controlling system, and the terminology "primary cooling equipment" includes, without limitation, apparatus to control the introduction of a cooled fluid from a remote source, for example metered chilled water, into the temperature controlling system.

While I have shown and described the preferred embodiments of my invention, it will be understood that various changes may be made in the idea or principles of the invention within the scope of the appended claims.

Having thus described my invention, what I claim and desire to secure by Letters Patent, is:

1. A system for controlling the temperatures in a predetermined plurality of zones defined in a building or the like comprising: a control panel, primary and secondary heating and cooling equipment, said secondary equipment being disposed in respective zones and sensing means located in each of said zones, and means provided in said panel to place both said primary equipment and said secondary equipment of each zone under the direct control of the sensing means in the respective zone, and means to extend the operation of said panel to place said primary equipment under the direct control of sensing means located in additional zones in said building and to place secondary equipment for each of said additional zones under the control of the sensing means thereof, said extending means including an auxiliary panel electrically connected with said control panel, and means in said auxiliary panel to apply and control the feed of power directly therethrough to the secondary equipment for said additional zones, respectively.

2. A panel for controlling the heating and cooling of a plurality of zones in a building or the like comprising normally inoperative heating alignment means adapted for operation in response to a heating selection for said zones, normally inoperative cooling alignment means adapted for operation in response to a cooling selection for said zones, a sensing device in each of said zones, a normally inoperative zone operating means for each of said zones connected to said sensing device in the associated zone and in normal interrupted circuit relation with both of said alignment means for operation in response to the operation of both the associated sensing device and one of said alignment means, normally inoperative heating equipment operating means, and normally inoperative cooling equipment operating means, said heating equipment operating means being in normally interrupted circuit relation with each of said zone operating means and with said heating alignment means for operation in response to the operation of both said heating alignment means and one of said zone operating means, and said cooling equipment operating means being in normally interrupted circuit relation with each of said zone operating means and with said cooling alignment means for operation in response to the energization of both said cooling alignment means and one of said zone operating means.

3. A panel for controlling the heating and cooling of a plurality of zones in a building or the like comprising normally inoperative heating alignment means adapted for operation in response to a heating selection for said zones, normally inoperative cooling alignment means adapted for operation in response to a cooling selection for said zones, a sensing device in each of said zones, a normally inoperative zone operating means for each of said zones connected to said sensing device in the associated zone and in normal interrupted circuit relation with both of said alignment means for operation in response to the operation of both the associated sensing device and one of said alignment means, normally inoperative heating equipment operating means, and normally inoperative cooling equipment operating means, said heating equipment operating means being in normally interrupted circuit relation with each of said zone operating means and with said heating alignment means for operation in response to the operation of both said heating alignment means and one of said zone operating means, and said cooling equipment operating means being in normally interrupted circuit relation with each of said zone operating means and with said cooling alignment means for operation in response to the energization of both said cooling alignment means and one of said zone operating means, a circulating medium sensing device, a normally inoperative fan operating means for each of said zones connected to one side of said circulating medium sensing device for said zones under the control of the associated zone operating means, and each of said alignment means having means for interrupted circuit connection to the other side of the medium sensing device for energization of each of said fan operating means in response to the combined operation of one of said alignment means, the associated zone operating means and the medium sensing device.

4. A panel for controlling the heating and cooling of a plurality of zones in a building or the like comprising a power source, heating and cooling alignment relays in normal interrupted circuit relation with said power source and adapted to be energized in response to a heating and cooling selection, respectively, for said zones, a zone sensing device for each of said zones connected to said power source, an operating relay for each zone connected to a zone sensing device for connection to said power source through the zone sensing device under the control of one of said alignment relays, a heating equipment operating relay in normal interrupted circuit relation with said power source under the control of both said heating alignment relay and one of said zone operating relays, and a cooling equipment operating relay in normal interrupted circuit relation with said power source under the control of both said cooling alignment relay and one of said zone operating relays.

5. A panel for controlling the heating and cooling of a plurality of zones in a building or the like comprising a power source, heating and cooling alignment relays in normal interrupted circuit relation with said power source and adapted to be energized in response to a heating and cooling selection, respectively, for said zones, a zone sensing device for each of said zones connected to said power source, an operating relay for each zone connected to a zone sensing device for connection to said power source through the zone sensing device under the control of one of said alignment relays, a heating equipment operating relay in normal interrupted circuit relation with said power source under the control of both said heating alignment relay and one of said zone operating relays, and a cooling equipment operating relay in normal interrupted circuit relation with said power source under the control of both said cooling alignment relay and one of said zone operating relays, a circulating medium sensing device, a normally inoperative fan operating relay for each zone adapted for connection to one side of said a circulating medium sensing device for said zones under the control of the associated zone operating relay, and each of said alignment relays being adapted for interrupted circuit connection to another side of the medium sensing device for energization of each of said fan operating relays in response to the combined operation of one of said alignment relays, the associated zone operating relay and the medium sensing device.

6. A panel for controlling the heating and cooling of a plurality of zones in a building or the like comprising a pair of power terminals, a heating alignment relay and a cooling alignment relay each having a relay coil one end of which is in circuit with one terminal of said pair, selector means for connecting the other end of one of said relay coils to the other of said pair of terminals, a zone operating relay for each zone provided with a relay coil having one end thereof connected to said one terminal, a sensing device for each zone in circuit between the other end of each zone relay coil and normally open contacts of said alignment relays, respectively, which are in circuit with said other of said terminals for energizing a zone relay in response both to the energization of one of said alignment relays and the operation of the associated zone sensing device, a heating equipment operating relay and a cooling equipment operating relay, the coil of said heating equipment relay having one end thereof connected to said one power terminal under the control of said zone operating relays and the other end thereof connected to said other power terminal under the control of said heating alignment relay, and the coil of said cooling equipment relay having one end thereof connected to said one power terminal under the control of said zone operating relays and the other end thereof connected to said other power terminal under the control of said cooling alignment relay.

7. A control panel as defined in claim 6, further characterized in the provision of a fan operating relay for each zone, each fan operating relay having a coil one end of which is connected to said one power terminal, a circulating medium sensing device for said zones, one end of said medium sensing device being in interrupted circuit relation with the other of said power terminals through normally open contacts of said alignment relays, respectively, and the other end of said medium sensing device being in interrupted circuit relation with the other ends of said fan relay coils through normally open contacts of said zone operating relays, respectively.

8. A panel as defined in claim 6, further characterized in that the sensing device in one of said zones is operative in response to a decrease in the temperature of said one zone and the sensing device in another of said zones is operative in response to an increase in the temperature of said other zone.

9. A panel as defined in claim 8, further characterized in including an auxiliary panel and in that the sensing device in at least one additional zone is operative in response both to a decrease and an increase in temperature of said additional zone, said auxiliary panel including at least one additional zone operating relay and at least one zone fan relay selectively interconnected with said heating and cooling alignment relays and said heating and cooling equipment operating relays of said panel.

10. A panel as defined in claim 6, further characterized in that the sensing devices in at least two of said zones are each operative in response to an increase in the temperature of the associated zone, a dehumidification timing means, and means operable when said cooling alignment relay is energized to selectively energize one or more of the zone relay coils of said two zones under the control of said dehumidification timing means.

11. A panel as defined in claim 2, further characterized in the provision of an exhaust fan, means to operate said exhaust fan, a sensing device operable upon an increase in temperature and located in the area to be exhausted, and means to operate said exhaust fan means in response to the operation of both said sensing device and said cooling alignment means.

12. In a system for controlling the heating and cooling of a plurality of zones in a building or the like comprising a control panel provided with a power source, heating and cooling alignment relays, an operating relay for each zone and a fan operating relay for each zone, said alignment relays being in normal interrupted circuit relation with said power source means operable to selectively complete the circuit between a selected one of said alignment relays and said power source, said fan relays being in normal interrupted circuit relation with said power source, a manual switch operable to complete each fan relay circuit to said power source in the de-energized condition of the associated zone relay, a zone sensing means for each zone operable in response both to an increase and a decrease in zone temperature to sense a requirement for the cooling and the heating, respectively, of the associated zone, each zone operating relay being in normal interrupted circuit relation with said power source, each zone relay circuit being completed in response both to the energization of one of said heating and cooling alignment relays and a corresponding requirement sensing of its associated zone sensing means, means responsive to the energization of each zone relay to interrupt the energizing circuit of the associated fan relay through the associated switch, a circuating medium sensing device for said zones operable in response both to an increase and a decrease in the temperature of the circulating medium resulting from the heating and cooling, respectively, of said medium, and means responsive both to the operation of one of said heating and cooling alignment relays and a corresponding heating-cooling operation of the circulating medium sensing device to complete a circuit between each fan relay and the power source.

13. The system defined in claim 12, further characterized in that each of said zone and medium sensing devices has a common terminal, a heating terminal, a cooling terminal and means to bridge said common terminal and one of the other terminals in response to temperature change, said cooling terminals being both connected to normally open contacts of said cooling alignment relay, said heating terminals being both connected to normally open contacts of said heating alignment relay, said normally open contacts completing a circuit to the power source in response ot energization of the associated alignment relay, the common terminal of each zone thermostat being connected to one side of the coil of the associated zone relay and the other side of said coil being connected to the power source, one side of each switch being connected to the power source and the other side thereof being connected to normally closed contacts of the associated zone relay, one end of each fan relay coil being connected to the power source and the other coil end being connected to said normally closed contacts of the associated zone relay, the common terminal of said medium sensing device being connected to normally open contacts of each zone relay and the normally closed and normally open contacts of each zone relay being interconnected.

14. A panel for controlling the heating and cooling of a plurality of zones in a building or the like comprising normally inoperative heating alignment means adapted for operation in response to a heating selection for said zones, normally inoperative cooling alignment means adapted for operation in response to a cooling selection for said zones, a normally inoperative zone operating means for each of said zones, a sensing device for each zone, each zone operating means being in normal interrupted circuit relation with both of said alignment means through the associated sensing device for operation in response to the operation of both the associated sensing device and one of said alignment means, normally inoperative heating equipment operating means, and normally inoperative cooling equiment operating means, said heating equipment operating means being in normally interrupted circuit relation with each of said zone operating means and with said heating alignment means for operation in response to the operation of both said heating alignment means and one of said zone operating means, and said cooling equipment operating means being in normally interrupted circuit relation with each of said zone operating means and with said cooling alignment means for operation in response to the energization of both said cooling alignment means and one of said zone operating means, said heating equipment means having an energizing circuit provided with a single throw sensing device and with a double throw sensing device in series therewith, said latter sensing devices being operable in response to the temperature of the fluid of said heating equipment, said double throw sensing device completing in one position thereof an energizing circuit for said heating equipment up to a predetermined temperature of said fluid, and said single throw sensing device completing through the other position of said double throw sensing device a second energizing circuit for said heating equipment above said predetermined temperature and up to a predetermined higher temperature in response to the energization of both said alignment means and one of said zone sensing means.

References Cited in the file of this patent

UNITED STATES PATENTS

| | | |
|---|---|---|
| 2,241,060 | Gibson | May 6, 1941 |
| 2,495,856 | Markusen | Jan. 31, 1950 |
| 2,555,012 | Spofford | May 29, 1951 |
| 2,598,397 | Levine | May 27, 1952 |
| 2,708,568 | Marshall | May 17, 1955 |
| 2,739,792 | Blum | Mar. 27, 1956 |
| 2,751,155 | Collat | June 19, 1956 |
| 2,787,128 | Brown | Apr. 2, 1957 |
| 2,793,812 | McDonald | May 28, 1957 |